(12) United States Patent
Dariush et al.

(10) Patent No.: US 8,924,021 B2
(45) Date of Patent: Dec. 30, 2014

(54) CONTROL OF ROBOTS FROM HUMAN MOTION DESCRIPTORS

(75) Inventors: Behzad Dariush, Sunnyvale, CA (US); Bing Jian, Exton, PA (US)

(73) Assignee: Honda Motor Co., Ltd., Tokyo (JP)

(*) Notice: Subject to any disclaimer, the term of this patent is extended or adjusted under 35 U.S.C. 154(b) by 1474 days.

(21) Appl. No.: 11/734,758

(22) Filed: Apr. 12, 2007

(65) Prior Publication Data

US 2007/0255454 A1 Nov. 1, 2007

Related U.S. Application Data

(60) Provisional application No. 60/796,060, filed on Apr. 27, 2006.

(51) Int. Cl.
*B25J 13/08* (2006.01)
*B25J 9/22* (2006.01)
*G06N 3/00* (2006.01)
*G05B 15/00* (2006.01)
*G06F 19/00* (2011.01)

(52) U.S. Cl.
CPC ...... *G06N 3/008* (2013.01); *G05B 2219/40391* (2013.01); *G05B 2219/40495* (2013.01); *Y10S 901/03* (2013.01); *Y10S 901/46* (2013.01)
USPC ........... 700/262; 700/245; 700/259; 700/261; 901/3; 901/46

(58) Field of Classification Search
CPC .............. B25J 3/04; B25J 9/1664; B25J 3/00; B25J 9/1607; B25J 9/1633; G05B 2219/39219; G05B 2219/40519; G05B 2219/39062; G05B 2219/40264; G05B 2219/40391; G05B 2219/40495; G06K 9/00362; G06T 2207/10016; G06T 2207/30196; G06T 7/2046
USPC ...................... 700/245–264; 318/567–568.25
See application file for complete search history.

(56) References Cited

U.S. PATENT DOCUMENTS

| 3,301,508 A | 1/1967 | Yamron |
| 4,831,549 A | 5/1989 | Red et al. |
| 4,848,525 A | 7/1989 | Jacot et al. |

(Continued)

FOREIGN PATENT DOCUMENTS

| JP | S 63-106806 A | 5/1988 |
| JP | S 63-300903 A | 12/1988 |

(Continued)

OTHER PUBLICATIONS

Chiacchio, Pasquale, et al. "Closed-loop inverse kinematics schemes for constrained redundant manipulators with task space augmentation and task priority strategy." The International Journal of Robotics Research 10.4 (1991): 410-425.*

(Continued)

*Primary Examiner* — Khoi Tran
*Assistant Examiner* — Dale Moyer
(74) *Attorney, Agent, or Firm* — Fenwick & West LLP; Mark E. Duell

(57) ABSTRACT

A control system and method generate torque comments for motion of a target system in response to observations of a source system. Constraints and balance control may be provided for more accurate representation of the motion as replicated by the target system.

18 Claims, 15 Drawing Sheets

Source System

Target System

(56) References Cited

U.S. PATENT DOCUMENTS

| | | | |
|---|---|---|---|
| 4,999,553 A | 3/1991 | Seraji | |
| 5,159,249 A * | 10/1992 | Megherbi | 318/568.1 |
| 5,276,390 A * | 1/1994 | Fisher et al. | 318/568.1 |
| 5,293,461 A * | 3/1994 | Grudic et al. | 700/262 |
| 5,341,459 A | 8/1994 | Backes | |
| 5,430,643 A * | 7/1995 | Seraji | 700/263 |
| 5,550,953 A * | 8/1996 | Seraji | 700/263 |
| 5,581,666 A * | 12/1996 | Anderson | 700/263 |
| 5,586,224 A * | 12/1996 | Kunii et al. | 700/260 |
| 5,625,577 A | 4/1997 | Kunii et al. | |
| 5,675,720 A | 10/1997 | Sato et al. | |
| 5,737,500 A * | 4/1998 | Seraji et al. | 700/251 |
| 5,808,433 A * | 9/1998 | Tagami et al. | 318/568.12 |
| 6,004,016 A | 12/1999 | Spector | |
| 6,016,385 A | 1/2000 | Yee et al. | |
| 6,028,608 A | 2/2000 | Jenkins | |
| 6,236,737 B1 | 5/2001 | Gregson | |
| 6,311,128 B1 | 10/2001 | Prum et al. | |
| 6,317,651 B1 * | 11/2001 | Gerstenberger et al. | 700/245 |
| 6,331,181 B1 * | 12/2001 | Tierney et al. | 606/130 |
| 6,341,246 B1 | 1/2002 | Gerstenberger et al. | |
| 6,424,885 B1 * | 7/2002 | Niemeyer et al. | 700/245 |
| 6,456,901 B1 * | 9/2002 | Xi et al. | 700/245 |
| 6,493,608 B1 * | 12/2002 | Niemeyer | 700/302 |
| 6,554,706 B2 | 4/2003 | Kim et al. | |
| 6,577,925 B1 | 6/2003 | Fromherz | |
| 6,674,877 B1 | 1/2004 | Jojic et al. | |
| 6,683,968 B1 | 1/2004 | Pavlović et al. | |
| 6,694,044 B1 | 2/2004 | Pavlović et al. | |
| 6,699,177 B1 * | 3/2004 | Laby et al. | 600/102 |
| 6,708,142 B1 | 3/2004 | Baillot et al. | |
| 6,786,896 B1 | 9/2004 | Madhani et al. | |
| 6,853,964 B1 | 2/2005 | Rockwood et al. | |
| 6,888,549 B2 | 5/2005 | Bregler et al. | |
| 6,985,620 B2 | 1/2006 | Sawhney et al. | |
| 6,995,536 B2 | 2/2006 | Challoner | |
| 6,999,601 B2 | 2/2006 | Pavlović et al. | |
| 7,001,413 B2 | 2/2006 | Butler | |
| 7,106,334 B2 | 9/2006 | Imagawa et al. | |
| 7,274,800 B2 | 9/2007 | Nefian et al. | |
| 7,292,151 B2 | 11/2007 | Ferguson et al. | |
| 7,386,366 B2 | 6/2008 | Dariush | |
| 7,403,880 B2 | 7/2008 | Maille et al. | |
| 7,457,733 B2 | 11/2008 | Maille et al. | |
| 7,469,166 B2 | 12/2008 | Dariush | |
| 7,573,477 B2 | 8/2009 | Ng-Thow-Hing | |
| 7,688,016 B2 * | 3/2010 | Aghili | 318/568.11 |
| 7,859,540 B2 | 12/2010 | Dariush | |
| 8,170,287 B2 | 5/2012 | Dariush et al. | |
| 8,467,904 B2 * | 6/2013 | Dariush | 700/262 |
| 2002/0173878 A1 | 11/2002 | Watanabe et al. | |
| 2003/0113018 A1 | 6/2003 | Nefian et al. | |
| 2003/0171847 A1 | 9/2003 | Cheng et al. | |
| 2004/0151504 A1 | 8/2004 | Triebes et al. | |
| 2004/0193234 A1 | 9/2004 | Butler | |
| 2004/0193413 A1 | 9/2004 | Wilson et al. | |
| 2004/0267404 A1 | 12/2004 | Danko | |
| 2005/0001842 A1 * | 1/2005 | Park et al. | 345/474 |
| 2005/0107916 A1 | 5/2005 | Nagasaka | |
| 2005/0177276 A1 | 8/2005 | Morel et al. | |
| 2005/0271279 A1 | 12/2005 | Fujimura et al. | |
| 2006/0074527 A1 * | 4/2006 | Bhatt et al. | 700/251 |
| 2006/0111761 A1 | 5/2006 | Butler | |
| 2006/0139347 A1 | 6/2006 | Choi et al. | |
| 2006/0139355 A1 | 6/2006 | Tak et al. | |
| 2006/0241809 A1 * | 10/2006 | Goswami et al. | 700/245 |
| 2006/0269145 A1 | 11/2006 | Roberts | |
| 2006/0293790 A1 * | 12/2006 | Gienger | 700/245 |
| 2006/0293792 A1 | 12/2006 | Hasegawa et al. | |
| 2007/0013336 A1 * | 1/2007 | Nowlin et al. | 318/568.21 |
| 2007/0073365 A1 | 3/2007 | Butler | |
| 2007/0083290 A1 * | 4/2007 | Nagasaka | 700/245 |
| 2007/0140562 A1 | 6/2007 | Linderman | |
| 2007/0162164 A1 | 7/2007 | Dariush | |
| 2007/0233280 A1 | 10/2007 | Bacon et al. | |
| 2008/0019589 A1 | 1/2008 | Yoon et al. | |
| 2008/0181459 A1 | 7/2008 | Martin et al. | |
| 2008/0234864 A1 | 9/2008 | Sugiura et al. | |
| 2008/0317331 A1 | 12/2008 | Winn et al. | |
| 2010/0145521 A1 | 6/2010 | Prisco et al. | |

FOREIGN PATENT DOCUMENTS

| | | |
|---|---|---|
| JP | 08-108383 A | 4/1996 |
| JP | 10-097316 | 4/1998 |
| JP | 11-33958 A | 2/1999 |
| JP | 2003-89082 A | 3/2003 |
| WO | WO 2007/076118 A2 | 7/2007 |
| WO | WO 2007/076118 A3 | 7/2007 |

OTHER PUBLICATIONS

Choi, Kwang-Jin, and Hyeong-Seok Ko. "On-line motion retargetting." Computer Graphics and Applications, 1999. Proceedings. Seventh Pacific Conference on. IEEE, 1999.*

Podder, Tarun Kanti, and N. Sarkar. "Motion planning and control of UVMS: a unified dynamics-based approach." OCEANS 2003. Proceedings. vol. 5. IEEE, 2003.*

Japanese Patent Office, Non-Final Office Action, Japanese Patent Application No. JP 2010-532163, Dec. 18, 2012, seven pages.

United States Patent and Trademark Office, Final Rejection, U.S. Appl. No. 12/317,369, Aug. 31, 2012, 21 pages.

Japanese Office Action, Japanese Application No. P2010-531282, Jun. 18, 2012, 6 pages.

PCT International Search Report and Written Opinion, PCT/US08/87657, Mar. 19, 2009, 8 pages.

PCT International Search Report and Written Opinion, PCT/US08/81171, Jan. 5, 2009, 10 pages.

PCT International Search Report and Written Opinion, PCT/US08/81201, Jan. 5, 2009, 9 pages.

PCT International Search Report and Written Opinion, PCT/US06/49247, Mar. 4, 2008.

PCT International Search Report and Written Opinion, PCT/US06/49253, May 30, 2008.

PCT International Search Report and Written Opinion, PCT/US07/67289, Mar. 14, 2008.

* cited by examiner

US 8,924,021 B2

CONTROL OF ROBOTS FROM HUMAN MOTION DESCRIPTORS

RELATED APPLICATIONS

This application claims a benefit of, and priority under 35 USC §119(e) to, U.S. Provisional Patent Application No. 60/796,060, filed Apr. 27, 2006, and titled "Reconstruction, retargetting, tracking, and estimation of human motion of low dimensional task descriptors", the contents of which are herein incorporated by reference.

This application is related to U.S. patent application Ser. No. 11/614,933, filed on Dec. 21, 2006, entitled "Reconstruction, Retargetting, Tracking, And Estimation of Motion of Articulated Systems", the contents of which are incorporated herein by reference in its entirety.

This application is related to U.S. patent application Ser. No. 11/614,930, filed on Dec. 21, 2006, entitled "Reconstruction, Retargetting, Tracking, And Estimation of Pose of Articulated Systems", the contents of which are incorporated herein by reference in its entirety.

This application is related to U.S. patent application Ser. No. 11/541,001, filed Sep. 29, 2006, U. S. Publication No: US 2007-0070738 A1, the subject matter of which is incorporated herein in its entirety. This application claims a benefit of, and priority under 35 USC 119(e) to, U.S. Provisional Patent Application No. 60/910,164, filed Apr. 4, 2007, and titled "Hierarchical Control of Robots From Human Motion Primitives", the contents of which are herein incorporated by reference.

FIELD OF THE INVENTION

The present invention generally relates to the field of controlling motion of a system, and more specifically, to controlling motion of a system using human motion descriptors.

BACKGROUND OF THE INVENTION

In recent years, there has been a growing interest in using captured human motion data as examples to simplify the process of programming or learning complex robot motions. See, e.g., A. Nakazawa, S. Nakaoka, K. Ikeuchi, and K. Yoko, "Imitating human dance motions through motion structure analysis", *Intl. Conference on Intelligent Robots and Systems (IROS)*, pages 2539-2544, Lausanne, Switzerland (2002). Captured human motion has been used to develop algorithms for 'learning from demonstration', a form of learning whereby a robot learns a task by watching the task being performed by a human. See, e.g., S. Schaal, "Learning from demonstration", In M. C. Mozer, M. Jordan, and T. Petsche, editors, *Advances in Neural Information Processing Systems*, chapter 9, pages 1040-1046. MIT Press (1997). One goal of 'learning from demonstration' has been to replace the time-consuming manual programming of a robot by an automatic programming process, solely driven by showing the robot the task by an expert teacher. Captured human motion has also been used in computer animation to 'retarget' motion of one articulated figure to another figure with a similar structure. See, e.g., S. Tak, O. Song, and H. Ko, "Motion balance filtering", *Comput. Graph. Forum*, (*Eurograhics* 2000), 19(3): 437-446, (2000). See also, e.g., S. Tak and H. Ko, "A physically-based motion retargeting filter", *ACM Trans. on Graphics*, 24(1):98-117 (2005).

The majority of existing approaches to control a robot from human demonstration use three steps. First, human motion is recorded using a marker based optical system, a magnetic system, or a wearable mechanical device resembling an exoskeleton. The recorded motion is then used as an input to a constrained non-linear optimization procedure to generate a re-designed joint level robot motion. See, e.g., A. Ude, C. G. Atkeson, and M. Riley, "Programming full-body movements for humanoid robots by observation", *Robotics and Autonomous Systems*, 47:93-108 (2004). Constraints are also imposed to enforce the robot's kinematic, dynamic, and balance constraints. See, e.g., Y. Tamiya M. Inaba S. Kagami, F. Kanehiro and H. Inoue, "Autobalancer: An online dynamic balance compensation scheme for humanoid robots", *In Int. Workshop Alg. Found. Robot*, (WAFR), Lausanne, Switzerland, (2000). Given sufficient computation time, a retargetted motion can be optimized off-line to satisfy a prescribed performance measure subject to the constraints. The retargetted joint motion is then used as the desired joint command input to the robot's independent joint controller. In the absence of external disturbances, the generated robot motion is kinematically and dynamically admissible by the robot and can be executed by the robot's control scheme during run-time.

Such a process has limitations. First, the complexity of sensing and instrumentation used to record human motion is time consuming and often limiting for use outside the laboratory. Moreover, the off-line re-targeting solution based on optimization methods is generally not suitable for online or reactive control of robots in dynamic scenes or in the presence of external disturbances. These limitations restrict the applicability of the approach to laboratory settings with static environments. An effective system should be interactive and therefore computationally fast, should work in static and dynamic environments, and should not rely on special instrumentation for the human demonstrator nor the environment.

SUMMARY OF THE INVENTION

Methods and systems provide for reconstructing, retargeting, tracking and estimating motion of an object from observation. The observation may include low dimensional task descriptors. Movement of members of a target system, which may be an articulated system such as a robot, may be controlled by tracking motion of an observed object. Constraints on movement of the members of the articulated system are enforced. Commands for controlling movement of the members of the articulated system are generated in response to the tracking motion and enforcing the constraints.

In other aspects, the methods and systems provide for reconstructing, retargeting, tracking and estimating motion of an object from received task descriptors. In other aspects, a balance control command is generated in response to the commands for controlling movement. In other aspects, the tracking may include first or second order closed loop inverse kinematics, or inverse dynamics, and may include regularization of the inverse Jacobian matrix.

Task descriptors may be used to define motion of a source system, such as a human, and to define motion of the robot. Task variables are assigned to portions of source system. Motion of the portions of the human represented by the task variables is detected. Commands for the articulated system are generated to replicate motion of the source system. The commands for the replication motion are adjusted in response to physical limitations of the articulated system for performing motions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
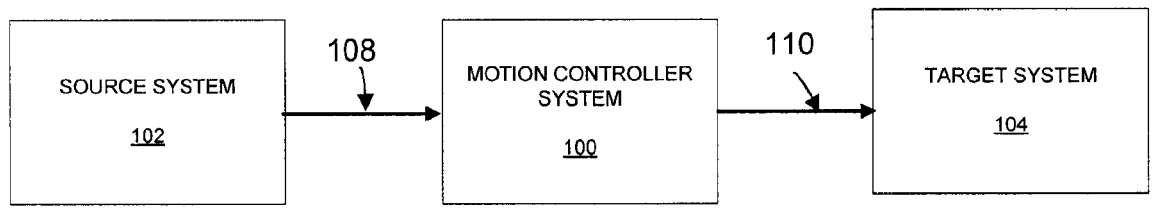
FIG. 1 is a block diagram illustrating a motion controller system for controlling a target system, such as a robotic/bio-robotic system, according to one embodiment of the present invention.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as systems or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Methods and systems of the present invention may use a unified, task oriented dynamic control for re-targeting. A vision module may produce a set of human motion descriptors, represented at the Cartesian (or task) level. The retargeting module receives normalized human motion descriptors and computes the desired robot joint command torque based on a hierarchical task oriented dynamic control framework. A tracking controller commands joint torques using various control methods, including decoupling control, independent joint control, gravity compensation control, or other combinations. The tracking controller converts a trajectory from Cartesian space trajectories to joint space trajectories using an internal servo loop or an external servo loop.

The tracking controller may process joint limit constraints and singularities using weighting matrices by a regularized Jacobian inverse solution. A retargeting controller allows the representation of the large number of mechanical degrees of freedom involved in the execution of movement tasks by motion primitives which can in principle be lower in dimension than the total number of degrees of freedom.

FIG. 1 is a block diagram illustrating a motion controller system 100 for controlling a target system 104, such as a robotic/bio-robotic system, according to one embodiment of the present invention. The motion controller system 100 detects motion descriptors 108 of a source system 102. The source system 102 may be, for example, a human or an animal. In response to the motion descriptors 108, the motion controller system 100 generates joint variables 110 for controlling the motion of the target system 104. The target system may be, for example, an articulated system, such as a robot an articulated mechanism (e.g., a human model) or an exoskeleton apparatus for wearing by a human or animal.

The motion controller system 100 may be used, for example, for retargeting, human pose estimation, tracking and estimation, or joint torque estimation in biomechanics.

Retargetting

The motion controller system 100 captures human motion data as examples to simplify the process of programming or learning complex robot motions. (See, e.g., A. Nakazawa, S. Nakaoka, K. Ikeuchi, and K. Yokoi, "*Imitating human dance motions through motion structure analysis,*" *Intl. Conference on Intelligent Robots and Systems* (*IROS*), pages 2539-2544, Lausanne, Switzerland, 2002). The motion controller system 100 may use algorithms for 'learning from demonstration', a form of learning whereby a robot learns a task by watching the task being performed by a human. (See, e.g., *S. Schaal*, "*Learning from demonstration*," M. C. Mozer, M. Jordan, and T. Petsche, editors, *Advances in Neural Information Processing Systems*, chapter 9, pages 1040-1046. MIT Press, 1997. The motion controller system 100 may use 'learning from demonstration' to replace the time-consuming manual programming of a robot by an automatic programming process, solely driven by showing the robot the task by an expert teacher. The motion controller system 100 may use captured human motion in computer animation to 'retarget' motion of one articulated figure to another figure with a similar structure. (See, e.g., S. Tak and H. Ko, "Motion balance filtering," *Comput. Graph. Forum.* (*Eurographics* 2000), 19(3):437-446, 2000; See, e.g., also S. Tak and H. Ko, "A physically-based motion retargetting filter", *ACM Trans. On Graphics*, 24(1):98-117, 2005.

Joint Torque Estimation in Biomechanics

Studies involving computational analysis of the neuromuscular system are typically concerned with either the synthesis or analysis of human motion. (See, e.g., S. Delp and P. Loan, "A computational framework for simulating and analyzing human and animal movement," *IEEE Computing in Science and Engineering*, 2(5):46-55, 2000; See, e.g., also D. Thelen, F. C. Anderson, and S. Delp, "Generating dynamic simulations of movement using computed muscle control," *Journal of Biomechanics*, 36:321-328, 2003. The synthesis problem, often referred to as forward dynamics analysis, provides the motion of the biomechanical system as a consequence of the applied forces and given initial conditions. From a system point of view, let S represent the system equations, describing the equation of motion of processed by the motion controller system 100. Because S may not be known precisely, an estimate (or model) of S may be represented by Ŝ, which describes the forward dynamics equations. By using the solution to the forward dynamics problem, the motion controller system 100 may simulate and predict the body segment's motion. (See, e.g. F. C. Anderson and M. G. Pandy, "Dynamic optimization of human walking," *Journal of Biomechanical Engineering*, 123:381-390, 2001). Numerical computation of movements produced by forward dynamics simulations have many applications. For example, in an embodiment involving surgical alterations, simulations may predict the anticipated consequences of the surgery on the person's movement pattern. (See, e.g., S. Piazza and S. Delp, "Three-dimensional dynamic simulation of total knew replacement motion during a step-up task," *Journal of Biomechanical Engineering*, 123: 589-606, 2002.)

The analysis, or inverse dynamics problem, can be viewed as the inverse of the synthesis problem. This technique provides insights into the net summation of all torques, and all muscle activity at each joint. The inverse dynamics model is a transformation of quantities obtained from a set of inputs derived from measurements to the estimated joint loads. A full kinematic description obtained from motion capture of marker positions is sufficient to obtain an exact or approximate inverse solution; however, motion capture is often combined with output from other sensors, including force plates, in order to improve the precision of the estimated joint loads. Since the optimal representation of the dynamic equations of motion will differ depending on the available sensors, inverse dynamics is in general considered a multi-modal sensing problem. (See, e.g., B. Dariush, H. Hemami, and M. Parnianpour, "Multi-modal analysis of human movement from external measurements", *Journal of Dynamic Systems, Measurement, and Control*, 123(2):272-278, 2002.)

Regardless of the sensing modes, inverse dynamics problems may be limited. First, the inverse dynamics equations are functions of linear and angular accelerations of body segments, using the calculations of higher order derivatives of experimental data contaminated by noise—a notoriously error prone operation (see J. Cullum, "Numerical differentiation and regularization," *SIAM J. Numer. Anal.*, 8(2):254-265, 1971.) Second, the applicability of inverse dynamics may be limited to the "analysis" problem. In other words, the solution may not directly answer the "what if" type questions (or the "synthesis" problem) typically encountered in clinical applications and addressed by forward dynamics simulations.

In one embodiment, the motion controller system 100 uses a task oriented resolved acceleration control scheme to control a framework for analysis and synthesis of human motion, whereby the estimation of internal forces and moments has been formulated as a task space tracking control problem. The system 100 tracks task variables which can represent, for example, the marker positions. Constraints can be imposed to avoid joint limits, muscular torque limits, and self collision avoidance, and the like.

The Source System 102 and Target System 104

Figure 2:
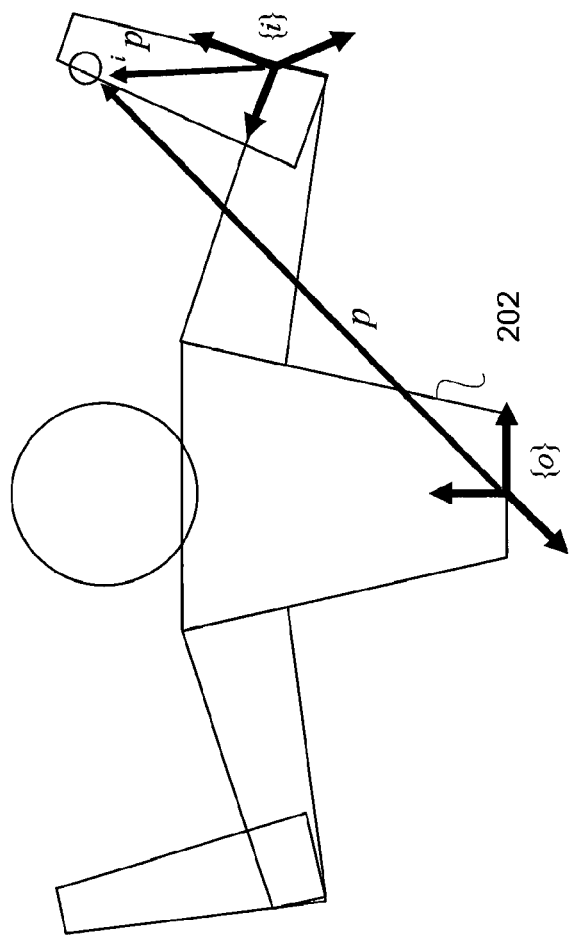
FIG. 2 is a diagram illustrating the association of a single task descriptor between a source model and a target model.
Figure 2:
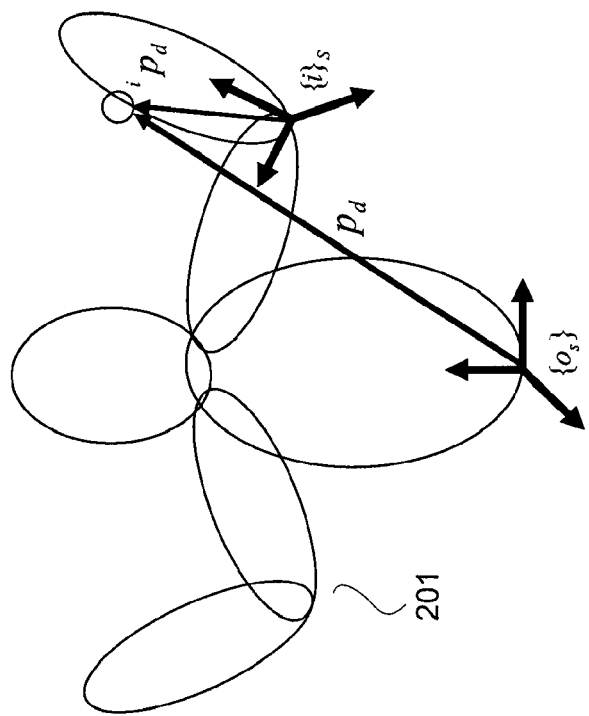

FIG. 2 is a diagram illustrating the association of a single task descriptor between a source model 201 and a target model 202 which corresponds to an articulated system. The source model 201 and the target model 202 may represent models of the source system 102 and the target system 104, respectively. In one embodiment, the source system 102 and the target system 104 are equivalent. In another embodiment, the source system 102 and the target system 104 are two different articulated body systems, and may have different dimensions, physical parameters, and degrees of freedom. The target system 104 may be described by kinematic parameters or kinematic and dynamic parameters, depending on whether the specific embodiment involves kinematic analysis or dynamic analysis.

In one embodiment, the target system 104 is a physical system or a model of a physical system, and the source system 102 is an abstraction of a physical system or model. The source system 102 may use one or more desired motion primitives, expressed in Cartesian (or task) space that are provided to the target system 104. These motion primitives are referred to as the desired task descriptors, obtained, for example, from either observations (measurements) or generated synthetically. The motion controller system 100 may obtain the desired motion primitives for the target system 104 using knowledge of the kinematic or dynamic structure of the source system 102.

In one embodiment, the source system 102 and the target system 104 may be a "Master-Slave" system where a master system drives the operation of a slave system. In this embodiment, the source system 102 (master) delivers a set of motion primitives that drives the target system 104 (slave). In one embodiment, the source motion is that which is extracted from observations of human motion. For the sake of illustration, without loss of generality, the source system 102 represents a human model and the source motion represents human motion primitives or "task descriptors" which are typically observed or inferred from measurements. Alternatively, the task descriptors may be synthetically generated or obtained from theoretical calculations. The target system 104 may be any generic articulated model, such as a human model or a humanoid robot.

In one embodiment, the dimension of the space to describe all observed task descriptors is different than the total number of degrees of freedom used to define the source system 102. In one embodiment, task descriptors are characterized by a vector space that occupies a smaller dimension that the total number of degrees of freedom specifying the source system 102.

Partially Observable/Controllable Tasks

An observed task descriptor from the source system 102 has a temporal correspondence between successive observations. In other words, there is a correspondence between the position and/or orientation of a task descriptor at successive time instances when the task descriptor is observable. Furthermore, spatial correspondence is assumed between an observed "Source" task descriptor and its associated "Target" task descriptor. For every observation of a given "Source" task descriptor, a corresponding "Target" task descriptor of the same dimension and analogous degrees of freedom may be defined. The "Source" and "Target" task descriptors need not be represented by six parameters required to specify the position of the task and the orientation of the task frame.

The scenarios for which task descriptors have fewer than six parameters are listed below.

The spatial position and/or orientation of the "Source" task descriptor may be partially observable. In other words, not all six degrees of freedom can be measured. This scenario may occur, for example, if the position variables associated with a task can be deduced from measurements, but not the orientation of the task frame.

The position and orientation of the "Source" task descriptor may be fully observable, but the target system 104 may execute a task with less than all six degrees of freedom. In other words, it suffices to represent the "Source" task descriptor with equal parameters as the "Target" task descriptor, even if the available measurements exceed the requirements to execute the task.

An execution of a task may be limited or impossible if the "Target" system has an insufficient number of degrees of freedom to execute the task.

Figure 3:
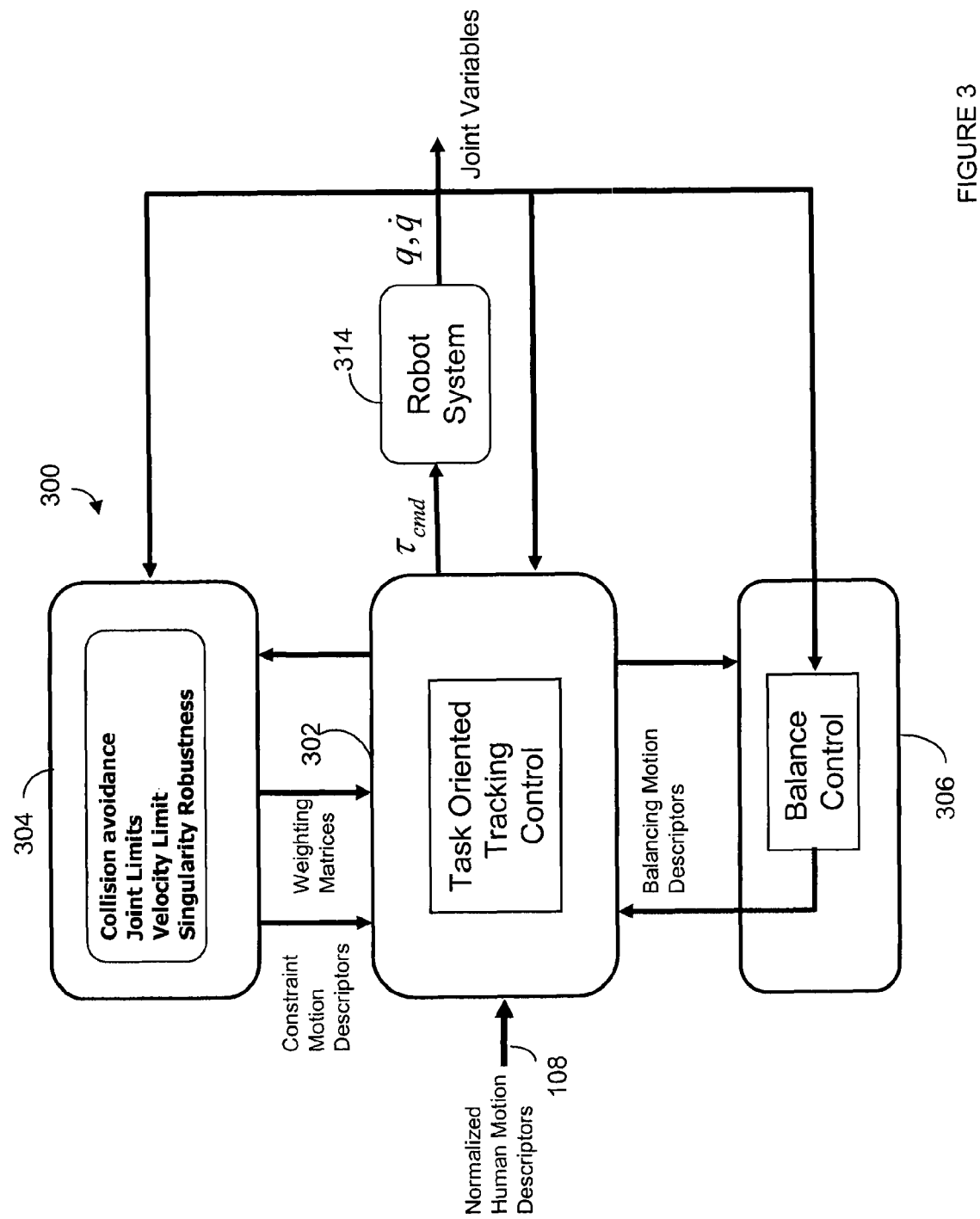
FIG. 3 is a block diagram illustrating a motion controller system for generating motion from observed motion descriptors.

FIG. 3 is a block diagram illustrating a motion controller system 300 for generating motion from observed motion descriptors. The motion controller system 300 generates a torque command $\tau_{cmd}$ for application to a robot system 314 in response to normalized motion descriptors 108 and sensed motion information from the robot system 314. The motion controller system 300 comprises a tracking control system 302, a constraints system 304, and a balance control system 306. The tracking control system 302 generates the torque command $\tau_{cmd}$ from observed motion descriptors 108, constraint motion descriptors and appropriate weighting matrices from the constraints system 304, and balance motion descriptors from the balance control system 306. The constraints system 304 generates the constraint motion descriptors in response to sensed position and sensed velocity from the robot system 314. The balanced control system 206 generates the balance motion descriptors in response to the sensed position and motion joint variables from the robot system 314.

Next, a task space control framework is described to generate motion for all degrees of freedom in the target system 104 from a set of desired motion primitives which are observed from measurements, synthesized, or computed from the current configuration of the target system 104. The tracking control system 302 generates motion results in a set of computed task descriptors which track the desired task descriptors, e.g., minimize the Cartesian tracking error. The balance control system 306 controls the resulting motion for balance and not move the target system 104 toward instability. The constraint system 304 provides commands to prevent the target system 104 from violating the physical limits, such as joint limits, velocity limits, torque limits, and also ensures the system 304 avoids obstacles, self collisions, and computational problems arising from singularities. The three control systems 302, 304 and 306 may present a large number of conflicting tasks which may be resolved through a hierarchical task management strategy. The precision of lower-priority (or lower level of importance) factors may be sacrificed at the expense of higher priority (or higher level of importance) factors as described below.

Figure 4:
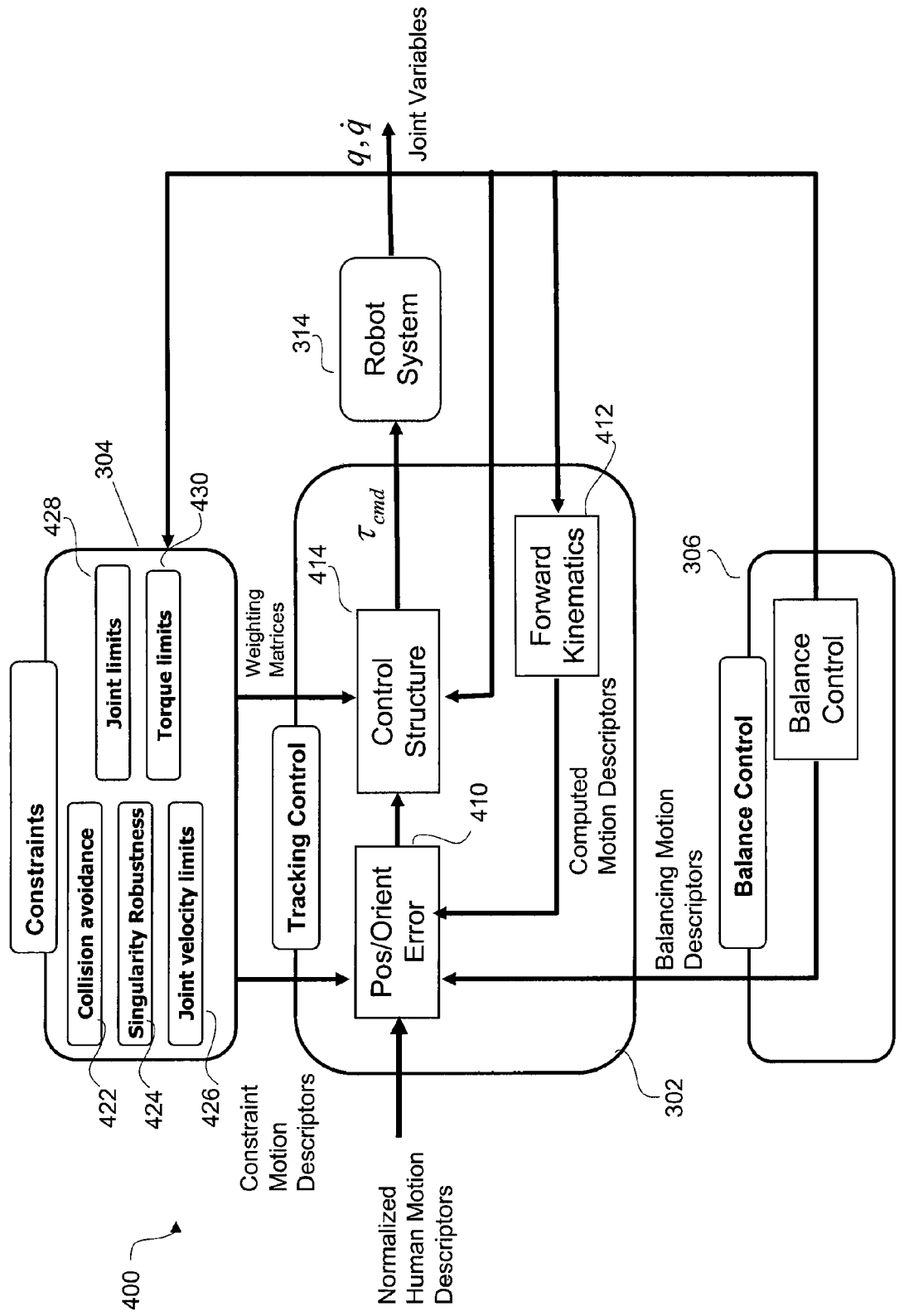
FIG. 4 is a block diagram illustrating one embodiment of the motion controller system of FIG. 3.

FIG. 4 is a block diagram illustrating the motion controller system 400, which is one embodiment of the motion controller system 300 at FIG. 3.

The tracking control system 302 includes a position/orientation error system 410 to generate an error in response to the observed task descriptors, the constraint task descriptors, the balancing task descriptors, and computed task descriptors from a forward kinematics system 412 of the tracking control system 302. The forward kinematics system 412 generates computed task descriptors in response to the joint variables q. A control system 414 generates a control signal in response to the position/orientation error from the position/orientation error system 410, the constraint task descriptors from the constraints system 304, and the joint variable q.

The constraints system 304 includes a collision avoidance system 422, a singularity robustness system 424, a joint velocity limits system 426, a joint limits system 428 and a torque limits system 430. The motion controller systems 300 and 400 are described in more detail below.

Kinematic Structure

In one embodiment, two different articulated body models are used—a human model as the source system 102 and a humanoid robot model as the target system 104. These two models are not necessarily equivalent: that is, they may have different dimensions, physical parameters, and degrees of freedom. A set of desired human motion primitives is associated with the human model. These motion primitives are derived by post-processing the observed motion primitives detected by a vision system (not shown). The post-processing may involve low pass filtering, interpolation, and re-scaling (or normaling) link dimensions from the human to the humanoid. The desired motion primitives are expressed in Cartesian (or task) space, and may be referred to as task descriptors. The dimension of the space used to describe all observed task descriptors need not be equal to the total number of degrees of freedom used to define the humanoid model.

Figure 5:
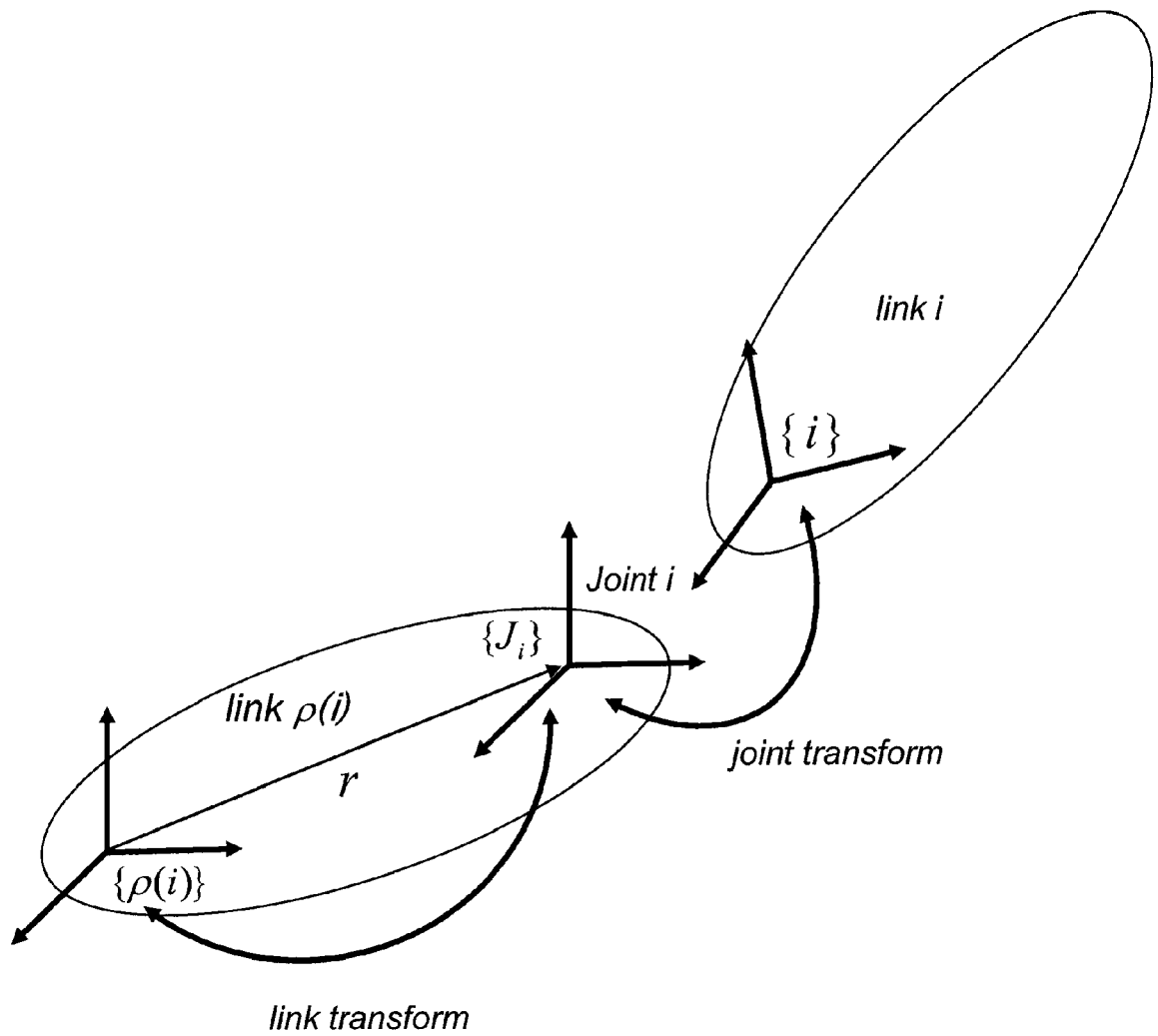
FIG. 5 is a diagram illustrating coordinate frames and transforms associated with a joint of the system of FIG. 1.

A motion controller system 300 is described for one embodiment that includes a kinematic structure. In one embodiment, the target system 104 represents general articulated mechanism with a tree structure. FIG. 5 is a diagram illustrating coordinate frames and transforms associated with a joint of the system 100. The articulated mechanism has N segments, numbered i=1 ... N and a total of $n_t$ degrees of freedom, numbered d=1 ... n. Each joint has $n_i$ degrees of freedom. The system has a fixed or moving base, considered the root node and numbered segment 0. A set of N joints connect between the segments so that joint i connects from segment $\rho(i)$ to segment i, where $\rho(i)$ is the link number of the parent of link i in the tree. The numbers are chosen so that $\rho(i)<i$. For the special case of an un-branched kinematic chain, $\rho(i)=i-1$ and the segments and joints are numbered consecutively from the base to the tip. Segment i has a set of children defined by $c(i)=\{j\}$ with:

$$c(i)=\{j|\rho(j)=i\} \quad (1)$$

Link and Joint Geometry

The transformation of a spatial vector quantity from the coordinate system {A} to frame {B} is given by $$^BX_A = \begin{bmatrix} ^BR_A & 0 \\ ^BR_A \tilde{r}_{ab}^T & ^BR_A \end{bmatrix} \quad (2)$$

where $r_{ab}$ is the 3×1 vector from the origin of frame {A} to the origin of frame {B}, with components referred to frame {A}. With the vector $r_{ab}=[r_{ab1}\ r_{ab2}\ r_{ab3}]^T$ the 3×3 skew symmetric matrix $\tilde{r}_{ab}$, is defined as:

$$\tilde{r}_{ab} = \begin{bmatrix} 0 & -r_{ab3} & r_{ab2} \\ r_{ab3} & 0 & -r_{ab1} \\ -r_{ab2} & r_{ab1} & 0 \end{bmatrix} \quad (3)$$

The tilde symbol (˜) is used to simplify notation of vector cross products. With this notation, cross products of arbitrary vectors a and b can be expressed as $$a \times b = \tilde{a}b \quad (4)$$

It follows that the transformation of a spatial vector quantity from the coordinate system of the parent link $\rho(i)$ to link i is given by $$^iX_{\rho(i)} = \begin{bmatrix} ^iR_{\rho(i)} & 0 \\ ^iR_{\rho(i)}\tilde{r}^T & ^iR_{\rho(i)} \end{bmatrix} \quad (5)$$

where r is the 3×1 vector from the origin of frame $\{\rho(i)\}$ to the origin of frame $\{i\}$, with components referred to frame $\{\rho(i)\}$. The link-to-link transformation described by Equation 5 includes a constant part, which describes the relative positions of two joints fixed to a single link, and a variable part, which describes the relative positions of two links connected by a joint. The variable part is a function of the appropriate joint variables, or the joint degrees of freedom, and is recomputed as the relative positions of the two links changes. The two transformations, described as link transforms and joint transforms, are illustrated in FIG. 5. The composite transformation given by Equation 6 can thus be decomposed into the product of the joint transform and the link transform, $$^iX_{\rho(i)} = {}^iX_{J_i}{}^{J_i}X_{\rho(i)} = X_J X_L \quad (6)$$

where $X_J = {}^iX_{J_i}$ represents the variable joint transform, and $X_L = {}^{J_i}X_{\rho(i)}$ represents the constant link transform.

Jacobians

In one embodiment, the target system 104 operates a task in the full six dimensional task space (n≥m, m=6). The position and orientation of the task descriptor is described by the vector $^op$, and the rotation matrix $^oR$, respectively. The notation of a leading superscript describes the frame that a quantity is referred to. For simplicity, hereafter, the leading superscript is suppressed for any quantity referred to in the base frame. In another embodiment, the target system 104 operates a task that is not completely specified (m<6).

Let the vector $q=[q_1, \ldots, q_n]^T$ describe the degrees of freedom which fully characterize the configuration of the target system 104. The set of all possible configurations is called configuration space, or joint space. The mapping between the joint space velocities and task space velocities is obtained by considering the differential kinematics relating the two spaces, $$\dot{x} = J(q)\dot{q} \quad (7)$$

where $J \in \mathfrak{R}^{m \times n}$ is the Jacobian of the task.

The vector $\dot{x}$ is defined by, $$\dot{x} = \begin{bmatrix} w \\ \dot{p} \end{bmatrix} \quad (8)$$

where w and p are vectors corresponding to the angular velocity of the task frame and the linear velocity of the task position, respectively. The Jacobian matrix may be decomposed into its rotational and translational components, denoted by $J_o$ and $J_p$, respectively, as:

$$J = \begin{bmatrix} J_o \\ J_p \end{bmatrix} \quad (9)$$

Let $^iv_i$ be the velocity of link i, referred to frame i. The standard recursive formula for computing link velocities in the link frame of reference is given by:

$$^iv_i = {}^iX_{\rho(i)}{}^{\rho(i)}v_{\rho(i)} + h_i\dot{q}_i \quad (10)$$

where $h_i$ has dimensions $6 \times n_i$ and represents the motion subspace for a particular joint, referred to the coordinate frame of body i. (See, e.g., Roy Featherstone and David Orin, "Robot dynamics: Equations and algorithms", *International Conference on Robotics and Automation*, San Francisco Calif., (2000). The motion subspace represents the free modes of joint i, and its columns make up a basis for this vector space. For example, the motion subspace of rotation about the z axis of a revolute joint connecting link i and $\rho(i)$ is given by:

$$h_i = [0\ 0\ 1\ 0\ 0\ 0]^T \quad (11)$$

Equation 10 can be converted to a summation form:

$$v_i = \sum_k^i X_k h_k \dot{q}_k \quad (12)$$

where $$^i X_k = {^i X_o}\, {^o X_k} \quad (13)$$

and where k represents the indices of links in the path from link i to the root. As in Equation 7, Cartesian velocities are related to joint velocities as follows:

$$^i v_i = J_i \dot{q} \quad (14)$$

where the Jacobian is expressed in the link frame and can be expressed as, $$^i J_i = [\ldots J_k \ldots] \quad (15)$$

where, $$J_k = \begin{cases} {^i X_k} h_k & \text{if } k \text{ is an ancestor of } i \\ 0 & \text{otherwise} \end{cases} \quad (16)$$

It follows that the Jacobian matrix for link i is related to the Jacobian matrix of its parent link by the following relationship:

$$^i J_i = [\, ^i X_{\rho(i)}\ ^{\rho(i)} J_{\rho(i)} \ \vdots \ h_i\,] \quad (17)$$

where the Jacobian of the first link is given by $^1 J_1 = h_1$. To obtain the Jacobian referred to the base (or root) frame, the following transformation may be used:

$$^o J_i = \begin{bmatrix} ^o R_i & 0 \\ 0 & ^o R_i \end{bmatrix} {^i J_i} \quad (18)$$

Tracking Control

The tracking control system 302 is next described. In one embodiment, tracking control refers to a control policy that produces a torque command $\tau_{cmd}$ by which the computed task descriptor kinematics of the robot system 314 tracks the desired task descriptor kinematics, subject to constraints imposed by the target system 104 based on the joint variables, defined by the vector q.

The basis for the solution of task space tracking control algorithms are the differential kinematics relating task variables and joint variables described in equation (7). In one embodiment, the motion controller system 100 uses a second order algorithm for control. Differentiating equation (7) provides:

$$\ddot{x} = J(q)\ddot{q} + \dot{J}(q,\dot{q})\dot{q} \quad (19)$$

A variety of inverse solution may be obtained from Equation 19, where generally, the solutions based on the second order system in equation 19 may involve kinematic and/or dynamic analysis.

Consider the first order differential kinematics given by Equation 7. In one embodiment, a desired motion of a task descriptor in the full six dimensional space is assigned. The associated differential kinematics of the desired motion is expressed by:

$$\dot{x}_d = [\,w_d\ \dot{p}_d\,]^T \quad (20)$$

$$\ddot{x}_d = [\,\dot{w}_d\ \ddot{p}_d\,]^T$$

where the desired angular velocity $w_d$ can be computed from:

$$w_d = H(\Theta_d)\dot{\Theta}_d \quad (21)$$

and the transformation matrix H depends on the particular set of the desired Euler angles, $\Theta_d$, considered. Equations 7 and 20 may be solved for the joint velocity vector $\dot{q}$, or the joint acceleration vector $\ddot{q}$ according to the following relationships:

$$\dot{q} = J^* \dot{x}_d \quad (22)$$

$$\ddot{q} = J^*(\ddot{x}_d - \dot{J}\dot{q}) \quad (23)$$

where $J^*$ denotes the regularized right pseudo-inverse of J weighted by the positive definite matrix $W_1$ and regularized by the positive definite damping matrix $W_2$, $$J^* = W_1^{-1} J^T (J W_1^{-1} J^T + W_2)^{-1} \quad (24)$$

The damping matrix may be used if J is an ill-conditioned matrix, the details of which are described below. If $W_2 = 0$, then Equation 24 is simply the weighted right pseudo-inverse of J. Furthermore, if J is a square non-singular matrix, $W_1$ is the identity matrix, and $W_2 = 0$, the matrix $J^*$ is replaced by the standard matrix inversion $J^{-1}$.

A position term or position and velocity feedback terms is introduced in equation 22 or equation 23, respectively. The tracking controller system 302 generates resulting first and second order inverse kinematics control laws given by:

$$\dot{q} = J^*(\dot{x}_d + K_p e) \quad (25)$$

$$\ddot{q} = J^*(\ddot{x}_d - \dot{J}\dot{q} + K_p e + K_v \dot{e}) \quad (26)$$

where $K_p$ and $K_v$ are positive definite gain matrices. In equation 26, $K_v$ may be selected to produce a critically damped response by using the relationship:

$$K_v 2\sqrt{K_p} \quad (27)$$

The error vector $e = [e_o\ e_p]^T$ describes the position error ($e_p$) and the orientation error ($e_0$) between the desired and computed task descriptors. The position error is defined as:

$$e_p = p_d - p \quad (28)$$

where $p_d$ and p correspond to the desired and computed task positions, respectively.

The computation of the orientation error may be complex and may be performed using various representations of orientation. A method based on the angle axis error is described.

The desired task orientation frame is usually described by a minimal number of coordinates, typically three Euler angles, described by the vector $\Theta_d$. It should be noted that the desired task orientation may be expressed by parameters other than Euler angles; nevertheless, $\Theta_d$ can be calculated if a desired rotation matrix $R_d$ is known. A functional expression of the orientation error in terms of an angle and axis error is given by:

$$e_o = \frac{1}{2}(n \times n_d + s \times s_d + a \times a_d) \quad (29)$$

where ($n_d$, $s_d$, $a_d$) and (n, s, a) correspond to the desired and actual unit vector triples of the task frame, respectively. (See, e.g., J. Y. S. Luh, M. W. Walker, and R. P. C. Paul, "Resolved-acceleration control of mechanical manipulators", *IEEE Transactions on Automatic Control*, 25:468-474, (1980)). The rotation matrix Rd is given by:

$$R_d = [n_d s_d a_d] \quad (30)$$

$$R = [n \, s \, a] \quad (31)$$

The position and orientation error ($e = [e_o \, e_p]^T$) are defined, as before, by Equations 28 and 29, respectively. The partition of the error rates follows accordingly, $$\dot{e} = [\dot{e}_o \dot{e}_p]^T \quad (32)$$

where $$\dot{e}_p = \dot{p}_d - \dot{p}$$

$$\dot{e}_o = w_d - w \quad (33)$$

Dynamic Equations of Motion

The dynamic equations of motion for a typical robotic system has the general form, $$M(q)\ddot{q} + C(q,\dot{q}) + G(q) + F(q,\dot{q}) = \tau \quad (34)$$

where M is the n×n joint space inertia matrix, C is the n×1 vector of Coriolis and Centripetal torques, G is the n×1 vector of gravitation torques, F is the n×1 vector of friction terms, and τ is the n×1 vector of joint torques. Equation 34 represents the joint space dynamics. The dynamics equations as well as the control may be expressed in terms task space, or "operational space". From Equation 19 and Equation 34, the task space (or operational space) dynamics used to describe the motion of a robot with respect to task variables may be derived. See, e.g., O. Khatib, "A unified approach for motion and force control of robot manipulators: The operational space formulation", *IEEE Journal of Robotics and Automation*, RA-3(1):43-53, (1987). The operational space dynamic equations have the structure:

$$M(x)\ddot{x} + C(x,\dot{x}) + G(x) + F(x,\dot{x}) = T \quad (35)$$

where M is the n×n operational space inertia matrix, and C, G, F and T are the Centrifugal and Coriolis force vector, the gravity vector, the friction vector, and the force-torque vector acting in operational space. Respectively, in the following sections, the dynamic parameters are used to construct model based control laws.

Trajectory Conversion Outside the Servo Loop

Figure 6:
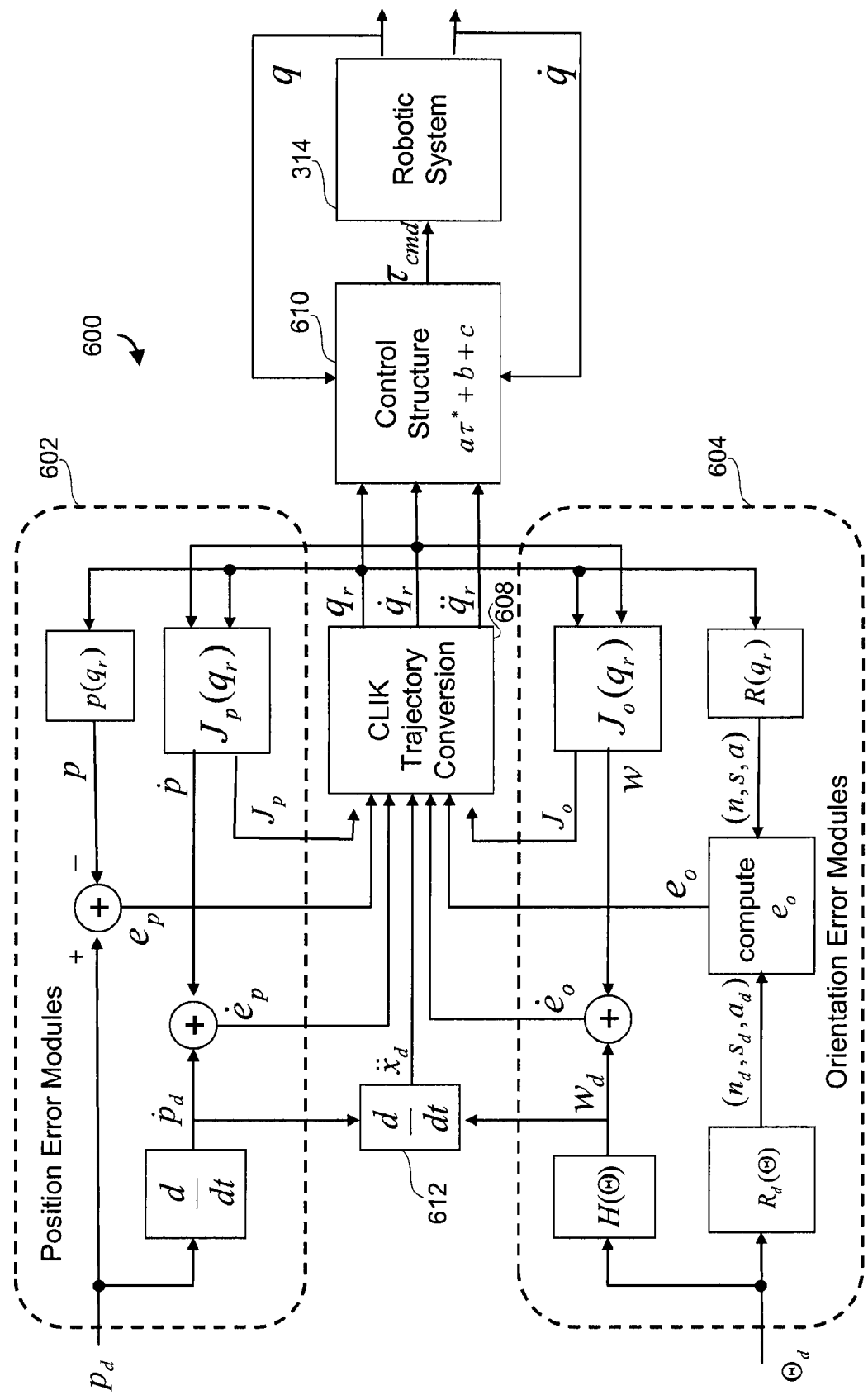
FIG. 6 is a block diagram illustrating a closed loop inverse kinematics still tracking system including an external control loop.

FIG. 6 is a block diagram illustrating the closed loop inverse kinematics (CLIK) tracking control system including an external control loop. The tracking control system comprises a position error system 602, an orientation error system 604, a closed loop inverse kinematics trajectory conversion system 608, a control structure 610, and a differentiator 612. The closed loop inverse kinematics trajectory conversion system 608 generates a control command for following a time-varying desired position and orientation of task descriptors, which is applied to the control structure 610 to generate the torque command. It should be noted that the system of FIG. 6 has a similar structure as the tracking controller system 302 illustrated in FIG. 3.

The CLIK trajectory conversion system 608 applies a control law such that task descriptors on the robot system 314 track corresponding normalized task descriptors on the human demonstrator, subject to the physical constraints of the robot system 314. The output of the tracking control structure 610 is the command torque obtained by a control law with the following general structure, $$\tau_{cmd} = \alpha \tau^* + b + c \quad (36)$$

The choice for vectors a, b, c and τ* depend on the type of control selected for command. Cartesian control schemes may be performed in one of two ways. The first approach uses a trajectory conversion process outside the servo loop to convert task space trajectories to joint space trajectories. The joint space trajectories are then used as the reference inputs to a joint-based servo scheme. The second approach, as will be described below in conjunction with FIG. 7 includes the trajectory conversion inside the servo loop.

The trajectory conversion process is described above. That is, the first and second order inverse kinematics equations followed by numerical integration can be used to convert the desired trajectories from Cartesian space to joint space. This trajectory conversion process yields the reference joint space trajectories $q_r$, $\dot{q}_r$ and $\ddot{q}_r$, used as the reference inputs to a joint space tracking controller. The control structure for such a scheme is illustrated in FIG. 6. In the following, examples of several trajectory conversion tracking control strategies using the control structure in Equation 36 are described.

Joint Space Dynamic Decoupling

The control structure 610 utilizes the second order closed loop inverse kinematics in Equation (26) followed by a joint space computed torque control method. The control structure is defined as follows:

$$a = \hat{M}(q) \quad (37)$$

$$b = \hat{C}(q,\dot{q}) + \hat{G}(q) + \hat{F}(q,\dot{q}) \quad (38)$$

$$c = 0 \quad (39)$$

$$\tau^* = \ddot{q}_r + G_p(q_r - q) + G_v(\dot{q}_r - \dot{q}) \quad (40)$$

where the caret notation ˆ denotes estimates of the components of the dynamic model. The feedback gain matrices $G_p$ and $G_v$ are positive definite gain matrices which may be designed to produce a critically damped response. The vector $\ddot{q}_r$ represents the reference acceleration as a result of the trajectory conversion process described in Equation 26:

$$\ddot{q}_r = J^*(q_r)(\ddot{x}_d - \dot{J}(q_r)\dot{q}_r + K_p e + K_v \dot{e}) \quad (41)$$

The vectors $q_r$ and $\dot{q}_r$ are obtained by numerical integration of $\ddot{q}_r$. The control structure 610 is a form of nonlinear model based compensation to dynamically decouple and linearize the closed loop system provided the estimated dynamic model parameters closely match the actual dynamics of the system. Under such circumstances, the control structure 610 provides tracking such that the resulting robot motion descriptors closely track the normalized human motion descriptors to produce human-like behaviors on the robot. However, exact dynamic parameters are sometimes difficult to obtain, particularly when modeling friction and Coriolis effects. In addition, for robots with a large number of degrees of freedom, the calculation of the model dynamics becomes time consuming and may be difficult to achieve at the servo rates of the robot. In such instances, the system 600 may use model based compensation, or purely error driven control schemes as will be described below.

Independent Joint Control

When robot parameters are difficult to compute in real time, or when their exact values are not available, the system 600 may use simple control laws that are strictly error driven and therefore computationally fast. With reference to the general control structure in Equation 32, the independent joint control law is given by, $$a=I \quad (42)$$

$$b=0 \quad (43)$$

$$c=\ddot{q}_r+G_v(\dot{q}_r-\dot{q})+G_p(q_r-q)+G_i\int(q_r-q)dt \quad (44)$$

$$\tau^*=0 \quad (45)$$

where I is an n×n identity matrix, and $G_v$, $G_p$, and $G_i$ are constant diagonal feedback gain matrices. The term $\ddot{q}_r$, or the integral action term are often set to zero. In such a control scheme, no communication is required between the joint servos; therefore a separate microprocessor may be used to implement Equation 44.

Because each joint controller in the independent-joint control schemes acts independently of the dynamics, they may produce perturbations at neighboring joints. Moreover the feedback gains may be constants and pre-specified. The controllers may not update the feedback gains under varying payloads. This may pose a problem for robots that are highly nonlinear systems whose inertial effects, the coupling between joints, and gravity effects are all either position dependent or position and velocity dependent terms. Furthermore, the inertial loading terms can change drastically at high speeds. Thus, the independent-joint control schemes described above using constant feedback gains to control a highly nonlinear robot may be modified for varying speeds and payloads.

Gravity Compensation

The control structure 610 may include a gravity model in the independent joint control scheme to improve the positioning error. The control becomes:

$$a=I \quad (46)$$

$$b=G(q) \quad (47)$$

$$c=\ddot{q}_r+G_v(\dot{q}_r-\dot{q})+G_p(q_r-q)+G_i\int(q_r-q)dt \quad (48)$$

$$\tau^*=0 \quad (49)$$

Such a control scheme is an example of partial model-based compensation. The gravity term compensates for the static torques due to gravity while the other terms provide additional damping torques at the joint which are expected to improve the transient behavior of the system. The addition of gravity terms makes the control of each joint depend on the configuration of the entire robot. Therefore, communication between each joint is performed. Gravity compensation control may be a compromise between the complete model based compensation control and the independent joint control. Gravity compensation may simplify computational efficiency of the independent joint control while providing some dynamic compensation of the gravity terms.

In other embodiments other forms of partial model based compensation are used. In some embodiments, the diagonal elements of the joint space inertia matrix, M(q), are also included in the compensation strategy.

Feed-Forward Compensation Plus PID

In one embodiment, the control structure 610 may provide joint driving torques that include the sum of a feed-forward centralized nonlinear controller to compensate for the dynamics and a decentralized independent joint proportional-integral-derivative (PID) controller. Such a control scheme is given by:

$$a=\hat{M}(q_r) \quad (50)$$

$$b=\hat{C}(q_r,\dot{q}_r)+\hat{G}(q_r)+\hat{F}(q_r,\dot{q}_r) \quad (51)$$

$$c=G_v(\dot{q}_r-\dot{q})+G_p(q_r-q)+G_i\int(q_r-q)dt \quad (52)$$

$$\tau^*=\ddot{q}_r=J^*(q_r)(\ddot{x}_d-\dot{J}(q_r)\dot{q}_r+K_pe+K_v\dot{e}) \quad (53)$$

Trajectory Conversion Inside the Servo Loop

Figure 7:
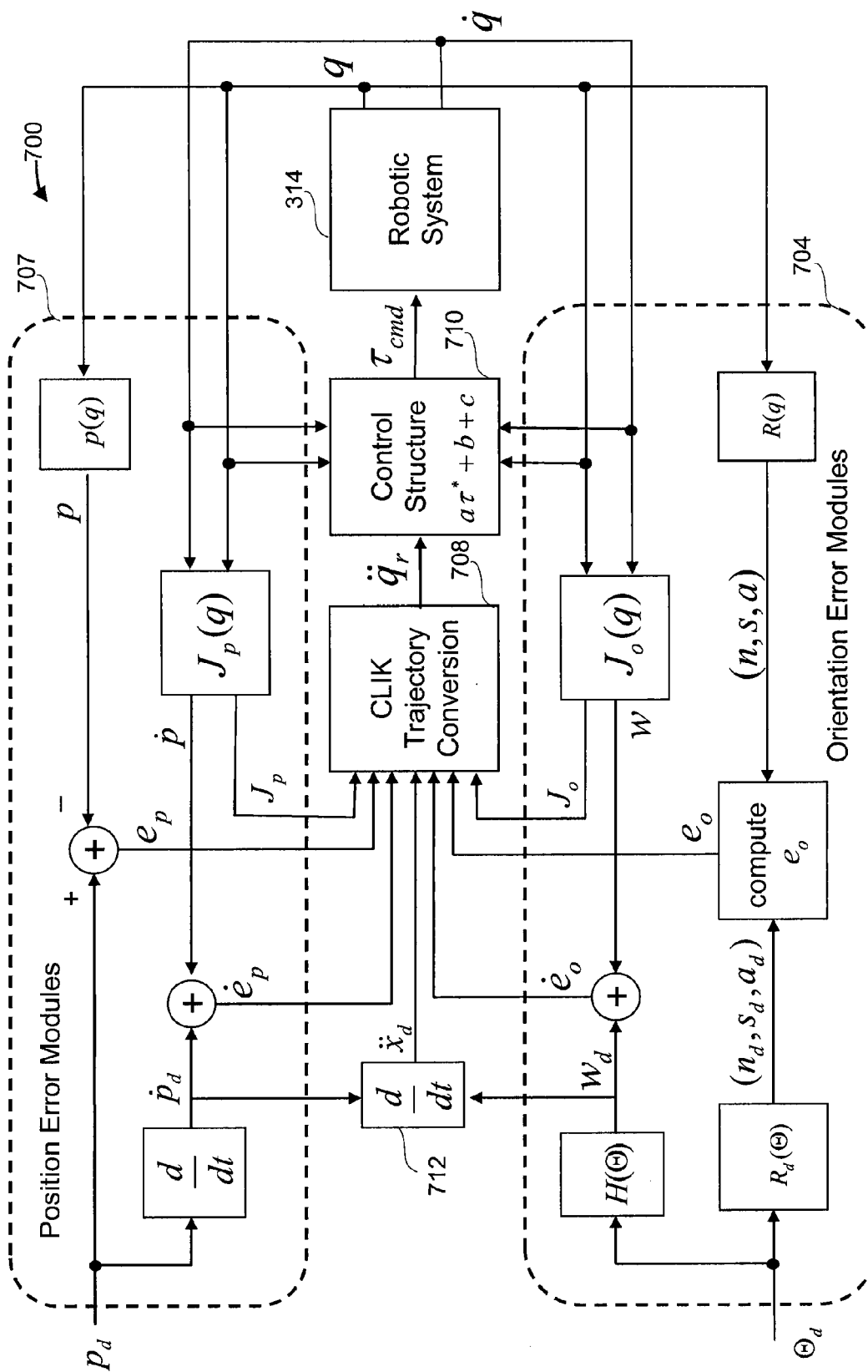
FIG. 7 is a block diagram illustrating a closed loop inverse kinematics tracking control system including an internal control loop.

FIG. 7 is a block diagram illustrating a closed loop inverse kinematics tracking control system 700 including an internal control loop. The system 700 includes a Cartesian decoupling scheme similar to the system 600, except the trajectory conversion is performed inside the servo loop. The tracking control system 700 comprises a position error system 702, an orientation error system 704, a closed loop inverse kinematics (CLIK) trajectory conversion system 708, a control structure 710, and a differentiator 712. The closed loop inverse kinematics trajectory conversion module 708 generates a control command for following a time varying desired position and orientation of task descriptors, which is applied to the control structure 610 to generate the torque command. The control structure 710 has a structure given by:

$$a=\hat{M}(q) \quad (54)$$

$$b=\hat{C}(q,\dot{q}_r)+\hat{G}(q_r)+\hat{F}(q_r,\dot{q}_r) \quad (55)$$

$$c=0 \quad (56)$$

$$\tau^*=\ddot{q}_r=J^*(q)(\ddot{x}_d-\dot{J}(q)\dot{q}+K_pe+K_v\dot{e}) \quad (57)$$

The trajectories from the actual sensed position of the robot system 314 are fed-back to the trajectory converter 708 and the control structure 710. The control structure 710 also provides nonlinear model based compensation to dynamically decouple and linearize the closed loop system.

The control structure 710 may use dynamically decoupled control inside the servo loop with the operational space dynamics given in Equation 35. A model based compensation in this space is given by, $$a=\hat{M} \quad (58)$$

$$b=\hat{C}(x,\dot{x})+\hat{G}(x)+\hat{F}(x,\dot{x}) \quad (59)$$

where, c=0 as in Equation 56. Decoupling and control of the task can therefore be achieved using $\tau^*=\ddot{x}$.

Managing Multiple Tasks

Figure 8:
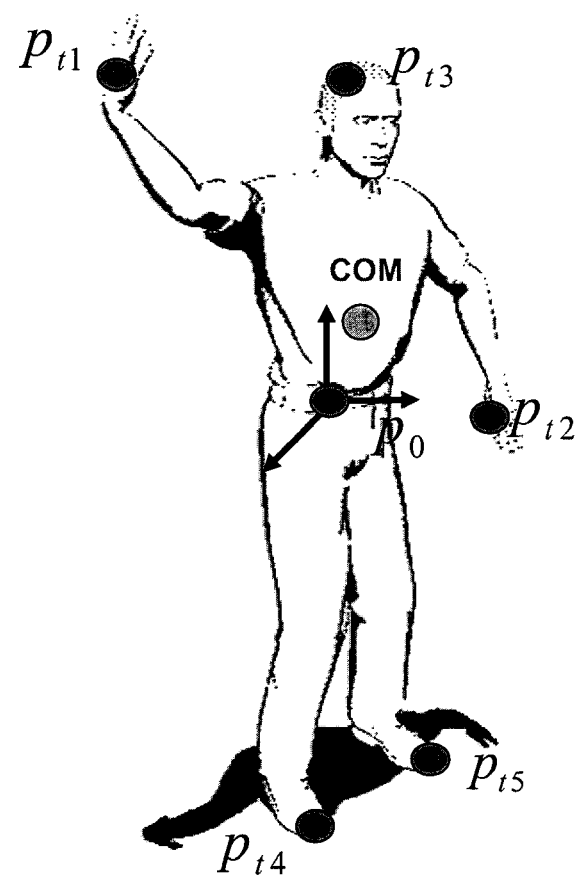
FIG. 8 is a diagram illustrating task descriptors on a source model and a generalized coordinate system.

FIG. 8 is a diagram illustrating task descriptors on a source model and a generalized coordinate system. A task descriptor may be any quantity that can be expressed as a function of the generalized coordinates. Examples of task descriptors may include positions of landmarks on body segments, orientations of body segments, or positions of whole body center of mass. Desired task descriptors may be obtained or inferred from measurements. FIG. 8 illustrates desired landmarks that can be conveniently measured or inferred and incorporated in the description of the task.

In one embodiment, the motion controller system 100 may perform multiple tasks simultaneously. For example, task descriptors may represent multiple landmark locations on the human structure. Execution of one task descriptor may have a higher importance or higher priority than other task descriptors. For example, suppose the target system 104 is to perform a grasping task. The source system 102 may provide multiple task descriptors, such as the desired hand position, and desired shoulder position. In instances in which the target system cannot satisfy multiple tasks, the motion controller system 100 may assign a higher weight or a higher priority to achieving the desired motion, such as hand position over achieving the desired shoulder position. Two embodiments of the motion controller system 100 for managing multiple tasks are described, namely, 1) weighting strategy and 2) prioritized strategy.

Task Augmentation: Weighting Strategy

The motion controller system 100 may use a weighting strategy for determining the tasks to execute. Suppose there are p number of tasks that are to be executed. Let $\dot{x}_i$ represent the spatial velocity of the $i_{th}$ task descriptor and $J_i$ the associated Jacobian. Task augmentation refers to the concatenation of the individual spatial velocities $\dot{x}_i$ into a 6r×1 vector $\dot{x}$, and the concatenation of the associated task Jacobian matrix $J_i$ to form the 6r×n matrix J, such that, $$\dot{x} = [\dot{x}_1 \ldots \dot{x}_p]^T \quad (60)$$

$$J = [J_1 \ldots J_p]^T \quad (61)$$

Likewise, $\dot{x}_d$ in the augmented space is the concatenation of the each desired task descriptor spatial velocity. The solution of a tracking control algorithm in the augmented system follows Equations 7 to 33, as described above.

The tracking error rate for each element of a task descriptor can be controlled by the feedback gain matrices. For a first order system in Equation 25, the trajectory tracking error convergence rate depends on the eignevalues of the feedback gain matrix K; the larger the eignevalues, the faster the convergence. In one embodiment, such systems may use a discrete time approximation of the continuous time system; therefore, it is reasonable to predict that an upper bound exists on the eigenvalues; depending on the sampling time. A particular task (or specific directions of particular task) can be more tightly controlled by increasing the eigenvalue of K associated with direction of the particular task.

Prioritizing Tasks

The motion controller system 100 may prioritize tasks for determining the tasks to execute. In one embodiment, a task comprises two subtasks with the order of priority. The first priority subtask is specified using the first task variable, $x_1 \in \Re^{m_1}$, and the second subtask by the second task variable, $x_2 \in \Re^{m_2}$. The two task variables may represent the position of a task descriptor and the orientation of its frame, respectively.

The differential kinematic relationship between the joint velocity $\dot{q} \in \Re^n$ and the Cartesian variable is expressed by:

$$\dot{q} = J_i^+(q)\dot{x}_i \quad (62)$$

where $J_i$ is the Jacobian matrix of the $i_{th}$ task descriptor and $J^+$ is typically defined as right pseudo-inverse if J, given by $J^+ = J^T(JJ^T)^{-1}$. An inverse kinematics solution with movement prioritization with the two desired movements is described by:

$$\dot{q} = J_1^+ \dot{x}_1 + N_1 v_n \quad (63)$$

where $v_n$ is an arbitrary vector and $N_1 = (I - J_1^+ J_1)$ projects $v_n$ onto the null space of $J_1$. If an exact solution does not exist, Equation 63 represents a least squares solution that minimizes $\|\dot{x}_1 - J_1(q)\dot{q}\|$. By substituting Equation 63 into Equation 62 for i=2, an exact solution for $v_n$ may be found if it exists. If an exact solution does not exist, a solution for $v_n$ may be found that minimizes, $\|\dot{x}_2 - J_2(q)\dot{q}\|$, given by:

$$v_n = (J_2 N_1)^+ (\dot{x}_2 - J_2 J_1^+ \dot{x}_1) \quad (64)$$

The above procedure for a prioritized two task problem has been outlined in Y. Nakamura, *Advanced Robotics, Redundancy and Optimization*, Adisson-Wesley, (1991).

Figure 15:
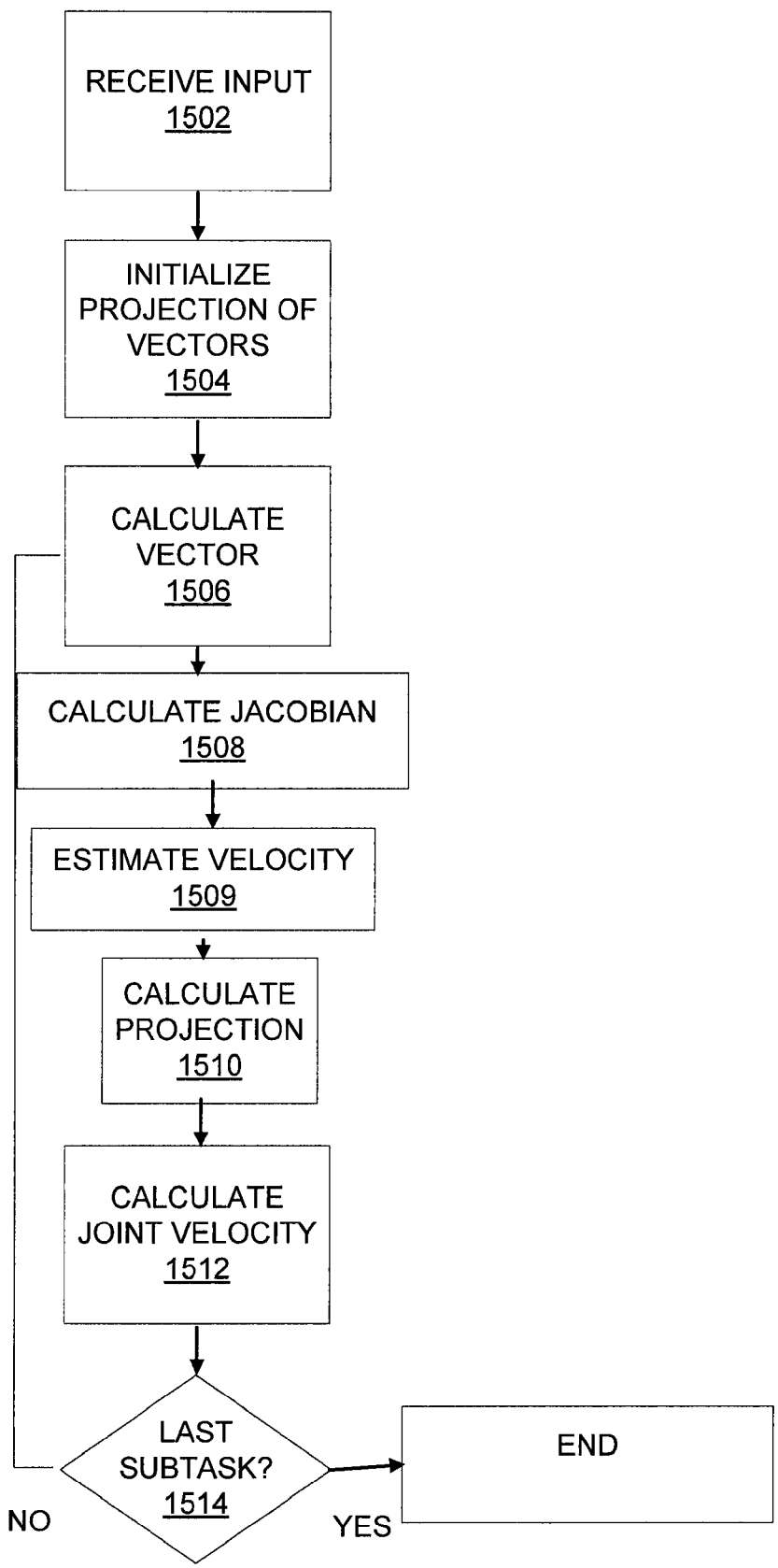
FIG. 15 is a flow chart illustrating a methodology of prioritizing more than two tasks.

FIG. 15 is a flow chart illustrating a methodology of prioritizing more than two tasks. The constraint system 304 receives 1502 input for the Jacobian matrix of the task descriptors and the position variables, such as:

$$J_i \in \Re^{m \times n}, \dot{x}_i \in \Re^{m_i}, \quad i,i=1,\ldots,k, \text{ where } k \text{ is the number of subtasks}$$

The constraint system 304 initializes 1504 a projection matrix N of the vectors, such as.

$$N_O = I \quad (65)$$

For each subtask i, the constraint system 304 calculates 1506 a velocity vector, such as:

$$v_i = \dot{x}_i \quad (66)$$

The constraint system 304 calculates 1508 the Jacobian matrix using the projection matrix, such as:

$$\hat{J}_i = J_i N_{i-1} \quad (67)$$

The constraint system 304 estimates 1509 the velocity, such as:

$$\hat{v}_i = v_i - J_i \sum_{j=1}^{i-1} (\hat{J}_j^+ \hat{v}_j) \quad (68)$$

The constraint system 304 calculates 1510 a projection matrix using the Jacobian, such as:

$$N_i = N_{i-1}(I - \hat{J}_i^+ \hat{J}_i) \quad (69)$$

The constraint system 304 calculates 1512 a joint velocity $\dot{q}$, such as:

$$\dot{q} = \sum_{i=1}^{k} (\hat{J}_i^+ \hat{v}_i) + N_k z \quad (70)$$

where $z \in \Re^n$ is an arbitrary vector.

The constraint system 304 repeats the setting 1506 until the last subtask is prioritized 1514.

In the methodology of FIG. 15, the $N_i$ are orthogonal projectors, which is used to derive the identity $N_{i-1}\hat{J}_i^+ = \hat{J}_i^+$. The projectors $\{N_i\}$ form a sequence of orthogonal projectors with decreasing ranks. The final solution space may be considered as the intersection of the k solution subspaces determined by the k subtasks. Let J be the matrix of size $\Sigma m_i \times n$ obtained by stacking $J_i$'s, the exact solution space is not empty if and only if J is of full row rank, namely rank(J)=$\Sigma m_i$. However, when the matrix J is rank deficient, namely rank(J) <$\Sigma m_i$, the system can only have solution in the least squares sense and the resulting joint velocity $\dot{q}$ may become very large due to the singularity of $J_i$.

Processing the singularity is described below, or may use a conventional process. See, e.g., Bruno Siciliano and Jean-Jacques E. Slotine, "A general framework for managing multiple tasks in highly redundant robotic systems", *In Proceedings of the IEEE International Conference on Advanced Robotics*, pages 1211-1216, Pisa, Italy, June (1991). In another embodiment, the pseudo-inverse $\hat{J}_i^+$ in the calculate 1512 is replaced by a singularity inverse, e.g., the damped least squares inverse described above.

Balance Control

The motion controller system 300 may directly observe or synthesize desired task variables, or may "infer" from a control policy that creates the desired task descriptors to produce a certain behavior. Such desired task descriptors are referred to here as "inferred" task descriptors, because they are typically inferred from a system that monitors the current state of the target system 104 and produces a desired task descriptor. Balance maintenance is an example of a behavior that may be controlled by an inferred balance descriptor.

In one embodiment, the target system 104 represents a human or a humanoid robot. Balance criteria such as the Zero Moment Point (ZMP), or whole body center of mass are used in order to produce a desired balancing descriptor that is a function of q. Commanding the position of the whole body center is one effective task descriptor to partially control balance.

Let $p_{cm}$ represent the position of the whole body center of mass, computed as $$p_{cm} = \sum_{i=1}^{N} \frac{m_i}{M} p_{cm_i} \qquad (71)$$

where M is the total body mass, and $m_i$ and $p_{cmi}$ correspond to the mass and the position of the center of mass of segment i, respectively. As before, the relationship between the center of mass velocity and the joint velocity is established through the Jacobian of the center of mass $J_{CM}$, $$\dot{p}_{CM} = J_{CM} \dot{q} \qquad (72)$$

Unlike the observed task descriptors which represent the desired motion obtained from measurements, the system 300 may include a separate control system to determine the desired position of the center of mass $p_{d_{cm}}$ that will produce a balanced motion.

In addition to the desired center of mass position, other descriptors can be used to control balance. For example, body inclination and feet positions are some examples. If task augmentation is used to manage all task descriptors, the relevant balance descriptor velocities can be concatenated together and incorporated into a single balancing descriptor vector velocity, denoted by $\dot{x}_b$. The 1 ... p observed tasks may be augmented with the balancing tasks in a similar manner as was done in Equations 43 and 44. The augmented system of the system 300 may be represented as:

$$\dot{x} = [\dot{x}_1 \ldots \dot{x}_p | \dot{x}_b]^T$$

$$J = [J_1 \ldots J_p | J_b]^T \qquad (73)$$

where for purpose of illustration only, the observed descriptors and the balancing descriptors are partitioned by a vertical separating line. In one embodiment, the balance descriptor is among the highest priority or the most important task descriptor to satisfy in many applications.

Constraints

In one embodiment, the target system 104 has kinematic and dynamic constraints that are to be satisfied. Constraints to avoid joint limits, self collisions, and collisions with the environment are examples of kinematic constraints. Singular configurations also impose constraints on the allowable regions of the workspace that the target system 104 can pass through without regularization. Moreover, the target system 104 may also have limits on the allowable joint velocities and joint torques. This is especially true if the target system 104 is a robot whereby actuator velocity limits and torque limits are critical. These constraints are sometimes handled in the null-space by specifying the vector $v_n$ for a convenient utilization of redundant degrees of mobility. These constraints may also be considered at the highest priority level, in which case they are used as the first task.

If the constraints are handled in the null-space, the motion controller system 300 may specify the vector $v_n$ for a convenient utilization of redundant degrees of mobility by constructing an objection function w(q) whose gradient defines the vector $v_n$, as:

$$v_n = k_o \left( \frac{\partial w}{\partial q} \right)^T \qquad (74)$$

where $k_o > 0$. Because the solution moves along the direction of the gradient of the objective function, it attempts to locally maximize it compatible to the primary objective (kinematic constraint). The motion controller system 300 may use an objective functions, e.g., for singularity avoidance, joint limit avoidance, and collision avoidance.

Handling Singularities

The motion controller system 100 may include processing for handling singularities, such as the singularity robustness system 324. The singularities may be task singularities due to physical limitations or algorithmic singularities due to mathematics of the motion. In configurations where the Jacobian matrix in Equation 7 is full rank, any velocity $\dot{x}$ can be attained. When J becomes rank deficient, the mechanism is said to be at a singular configuration. In the neighborhood of singular configurations, a small change in $\dot{x}$ may require a very large change in q. This causes a large error in the task motion, since the joint torques and velocities required to execute such a motion exceed the physical capabilities of the target system 104. The singularity problem becomes an inherent problem in controlling any target system 104 representing a physical model or system. Singularities impose constraints on the feasibility and accuracy of the solution and may be therefore characterized as constraints within control hierarchy of the motion controller system 100.

There are several embodiments for overcoming the inherent singularity problem. In one embodiment, the motion controller system 100 plans a trajectory that is away from singular points by using a potential function that is a measure of the manipulability of a task. In one embodiment, the mechanisms of the target system 104 may be allowed to pass through singular points and their neighborhood through the use of a singularity robust inverse of the Jacobian matrix (see Y. Nakamura and H. Hanafusa, "Inverse kinematic solution with singularity robustness for robot manipulator control", *ASME J. Dyn. Sys. Meas., Contr.*, 108(3):163-171, (1986)), also known as the damped least squares method (DLS) (see C. W. Wampler, "Manipulator inverse kinematic solutions based on vector formulations and damped least squares methods", *IEEE Trans. Sys., Man, Cyber.*, 16(1):93-101, (1986)). The transpose of the Jacobian can be used in lieu of matrix inversion, which provides a noticeable computation savings as well as it represents an alternative to the use of a DLS inverse for handling singularities (See L. Sciavicco and B. Siciliano, "A solution algorithm to the inverse kinematic problem for redundant manipulators", *IEEE Journal of Robotics and Automation*, 4:403-410, (1988)). The DLS method is described next in more detail.

The most general form of the damped least squares inverse was defined in Equation 24 and repeated below, $$J^* = W_1^{-1} J^T (J W_1^{-1} J^T + W_2)^{-1} \qquad (75)$$

where $W_2 = \lambda^2 I$ is the damping term, $\lambda > 0$ is the damping factor, and I is the identity matrix. If $W_1$ is the identity matrix, Equation 53 satisfies the optimization condition:

$$\min_{\dot{q}}(\|x - J(q)\dot{q}\|^2 + \lambda^2 \|\dot{q}\|^2) \quad (76)$$

Small values of $\lambda$ give accurate solutions but low robustness to the occurrence of singular and near-singular configurations. Large values of $\lambda$ result in low tracking accuracy even when a feasible and accurate solution would be possible. The damping factor establishes the relative weight between the two objectives. Choosing a constant value for $\lambda$ may turn out to be inadequate for obtaining good performance over the entire "Target" system workspace. There exists methods for adaptively selecting the damping factor based on some measure of closeness to the singularity at the current "Target" system configuration (See S. Buss and J. S. Kim, "Selectively damped least squares for inverse kinematics", *Journal of Graphics Tools* 10:3, 37-49, (2005)). (See A. A. Maciejewski and C. A. Klein, "Obstacle avoidance for kinematically redundant manipulators in dynamically varying environments", *International Journal of Robotics Research*, 4:109-117, (1985)).

Joint Limit Avoidance

The motion controller system 100 may use several methods to avoid joint limits. One is the Gradient projection method. A performance criterion is defined as a function of joint limits and its gradient is projected onto the null space projection matrix of the Jacobian to obtain the self-motion necessary to optimize the performance criterion. A second method is the Weighted Least-Norm (WLN) solution to avoiding joint limits. The WLN solution was originally proposed by T. F. Chan and R. V. Dubey, "A weighted least-norm solution based scheme for avoiding joint limits for redundant joint manipulators", *IEEE Transactions on Robotics and Automation*, 11(2), (1995). A WLN solution is formulated in the context of the Damped Least Squares Jacobian inverse.

Consider once again the weighted damped least squares inverse of J from Equation 24. Suppose $W_1$ is a diagonal matrix used for joint limit avoidance, defined by:

$$W_1 = \begin{bmatrix} w_1 & 0 & 0 & 0 \\ 0 & w_2 & 0 & 0 \\ 0 & 0 & \ddots & 0 \\ 0 & 0 & 0 & w_n \end{bmatrix} \quad (77)$$

The scalers $w_i$ corresponding to the diagonal elements of $W_2$ are defined by:

$$w_i = \begin{cases} 1 + \left|\frac{\partial H}{\partial q_i}\right| & \text{if } \Delta \left|\frac{\partial H}{\partial q_i}\right| \geq 0 \\ 1 & \text{if } \Delta \left|\frac{\partial H}{\partial q_i}\right| < 0 \end{cases} \quad (78)$$

where H(q) is the performance criterion to avoid joint limits and $$\frac{\partial H(q)}{\partial q_i}$$

is its gradient defined by:

$$H(q) = \frac{1}{4} \sum_{i=1}^{n} \frac{(q_{i,\max} - q_{i,\min})^2}{(q_{i,\max} - q_i)(q_i - q_{i,\min})} \quad (79)$$

$$\frac{\partial H(q)}{\partial q_i} = \frac{(q_{i,\max} - q_{i,\min})^2(2q_i - q_{i,\max} - q_{i,\min})}{4(q_{i,\max} - q_i)^2(q_i - q_{i,\min})^2} \quad (80)$$

where $q_i$ is $i_{th}$ degree of freedom, and $q_{i,min}$ and $q_{i,max}$ are the lower and upper joint limits, respectively. It should be noted that $$\frac{\partial H(q)}{\partial q_i}$$

is equal to zero if the joint is at the middle of its range and goes to infinity at either limit. The second condition in Equation 72 allows the joint to move freely if the joint is moving away from the limit because there is no need to restrict or penalize such motions.

Collision Avoidance

Collision avoidance of a target system 104 with itself or with other obstacles allows the target system 104 to safely execute a motion. The collision avoidance system 422 may handle collision avoidance by defining collision points which are identified at each instant when two point pairs are approaching collision. Each collision point in a point-pair is defined as either "re-active" or "passive". A re-active collision point may be regarded as a task descriptor for collision avoidance and controlled in the same way that other task descriptors are controlled. A re-active collision point, therefore, represents a collision task descriptor whose desired motion is determined based on a control policy which reacts to avoid collision. A passive collision point is one that is not explicitly controlled for collision avoidance. Passive collision points are either attached to an external system (such as the environment or obstacle), or attached to a different rigid body on the target system 104. In one embodiment, the motion controller system 100 processes a collision point that is attached to an external system as passive. This embodiment may be used, for example, if the collision point is not controllable by an internal control system of the target system 104.

If the collision points in a point-pair are both attached to the target system 104 (self collision), the designation of "re-active" and "passive" collision points is more complex. A practical resolution for the designation may be to consider metrics related to minimizing the energy required to move a collision point away from collision. One possible metric is to consider an inertia weighted Jacobian inverse for the inverse kinematics or inverse dynamics solution, by substituting $M = W_1$ in Equation 24, where M is the joint space inertia matrix. This solution minimizes the kinetic energy required to execute the task; however, the inertia weighted Jacobian inverse solution requires the calculation of the joint space inertia matrix which is computationally expensive and may not be practical for closed loop inverse kinematic solutions. A more computationally feasible and algorithmically simple alternative is to use the relative mass of the rigid body associated with collision point-pairs. The point-pair attached to the larger mass will be designated as the passive collision point while the point pair attached to the smaller mass will be designated as the re-active collision point. Consider, for example, the collisions between the hand and the torso. The torso collision point will be designated as a passive collision point while the hand collision point will be designated as a re-active collision point.

Once the designation of re-active and passive collision points have been established, the computed collision avoidance task descriptor velocity is defined by:

$$\dot{x}_c = p_p(q) - p_r(q) \tag{81}$$

where $p_p(q)$, $p_r(q)$ are the passive and reactive collision points. The term computed, as before, implies the quantities are calculated by the forward kinematics system 312 and are a function of q. The system in Equations (50) and (51) may be further augmented with the collision avoidance descriptor velocity and the associated Jacobian, denoted by $\dot{x}_c$ and $J_c$, respectively.

$$\dot{x} = [\dot{x}_1 \ldots \dot{x}_p | \dot{x}_b | \dot{x}_c]^T \tag{82}$$

$$J = [J_1 \ldots J_p | J_b | J_c]^T \tag{83}$$

The collision avoidance system 422 may determine a control policy that produces a desired collision avoidance task descriptor to: a) monitor the distance d to collision, and b) stop the motion of the collision point in the direction of the collision if the collision distance is less than a threshold $d < d_{thresh}$. The collision avoidance system 302 may command the desired velocity to be equal and opposite to the current direction of the collision point.

$$\dot{x}_{c_d} = \begin{cases} -\dot{x}_c & \text{if } d < d_{thresh} \\ 0 & \text{if } d \geq d_{thresh} \end{cases} \tag{84}$$

Joint Velocity Limits

There are typically limits on the allowable joint velocities of each degree of freedom in the target system 104, which may be determined by the physical limits of the actuators driving a joint. In robotics, joint velocity constraints may be handled by clamping the velocities when they reach their limit. Alternatively, velocities may be controlled by using a similar approach as the damped least squares Jacobian inverse described above by modulating the damping factor. While these approaches preserve the time to execute the entire motion, they do not preserve the original trajectory profile. The resulting motion trajectory may be significantly altered from the original motion. The joint velocity limits system 426 may limit joint velocities by adaptively modulating the time between two successive samples while keeping the original joint motion profile unaltered.

To simplify notation, the subscript i, previously referred to quantities associated with joint i (i.e. $q = q_i$ and $\dot{q} = \dot{q}_i$), is dropped. Let $\dot{q}_k$ (k=1 ... N) represent a length N sequence corresponding to a discrete time representation of $\dot{q}(t)$. In the discrete implementation of the algorithm, the discrete time sequence at sample k+1 is given by:

$$t_{k+1} = t_k + \Delta t_k \tag{85}$$

where $\Delta t_k$ is sample time. The time modulation scheme for joint limit avoidance replaces the time sequence in Equation 85 with the following:

$$t'_{k+1} = t'_k + \Delta t_k \epsilon_k \tag{86}$$

where $\epsilon_k$ is a time-modulation factor which can be designed to ensure that the joint velocities remain below their limits. In one embodiment, the factor $\epsilon_k$ meets the following conditions:
1. Preserve the profile of the original joint trajectory.
2. Preserve the sample time if joint velocity is below its limit, e.g., $\Delta_k = \Delta'_k$.
3. Modulate the sample time if the joint velocity is at, or beyond its limit such that modified velocity remains at its limit, i.e. $|\dot{q}'_k| = \dot{q}_{lim}$ where $\dot{q}_{lim}$ is the joint velocity limit associated with a particular degree of freedom. The first condition provides that:

$$\Delta q'_k = \Delta q_k \tag{87}$$

where, $$\Delta q_k = q_{k+1} - q_k$$

$$\Delta q'_k = q'_{k+1} - q'_k \tag{88}$$

A first order finite difference approximation of the time derivative provides:

$$\Delta q_k = \dot{q}_k \Delta t_k$$

$$\Delta q'_k = \dot{q}'_k \Delta t'_k \tag{89}$$

where $\Delta t'_k = \Delta t_k \epsilon_k$. It follows from Equations 86 and 89, and the third condition that:

$$|\dot{q}_k| \Delta t_k = \dot{q}_{lim} \Delta t_k \epsilon_k \tag{90}$$

where $|\dot{q}'_k| = \dot{q}_{lim}$ is forced. From Equation 90, $\epsilon_k$ is solved:

$$\epsilon_k = \frac{|\dot{q}_k|}{\dot{q}_{lim}} \tag{91}$$

The joint velocity limits system 426 may use a time modulation scheme that ensures the three conditions listed above, which are summarized as follows:

$$t'_{k+1} = \begin{cases} t'_k + \Delta t_k \epsilon_k & \text{if } \epsilon_k \geq 1 \\ t'_k + \Delta t_k & \text{if } \epsilon_k < 1 \end{cases} \tag{92}$$

where $\epsilon_k$ is defined by Equation 91. Note that by definition, $\epsilon_k > 1$ implies that the joint velocities are equal or above their limits and corrective action is required by modulating (expanding) time. Furthermore, $\epsilon_k < 1$ implies the joint velocities are below their limits and time modulation is unnecessary.

Note that the example above preserves the original motion profile, but may indeed expand the total time to execute the motion. In order to preserve the motion profile as well as the total execution time, other time modulation embodiments may use a $\Delta t_k$ that is expanded if joint velocities exceed their limits and $\Delta t_k$ is shortened if the joint velocities are below their limits. This may be performed in such a way that the overall execution time remains unchanged.

In another embodiment, time modulations may use the first and second order time derivatives of q that have certain smoothness and continuity characteristics. In this embodiment, the factor $\epsilon_k$ may be determined accordingly. The concept of time modulation may be applied to limit joint accelerations by considering the second order time derivative of q. In fact, the concept of time modulation may used to limit any physical quantity that can be expressed as a function of time.

Commanding Torque to Position Control Robots

Figure 9:
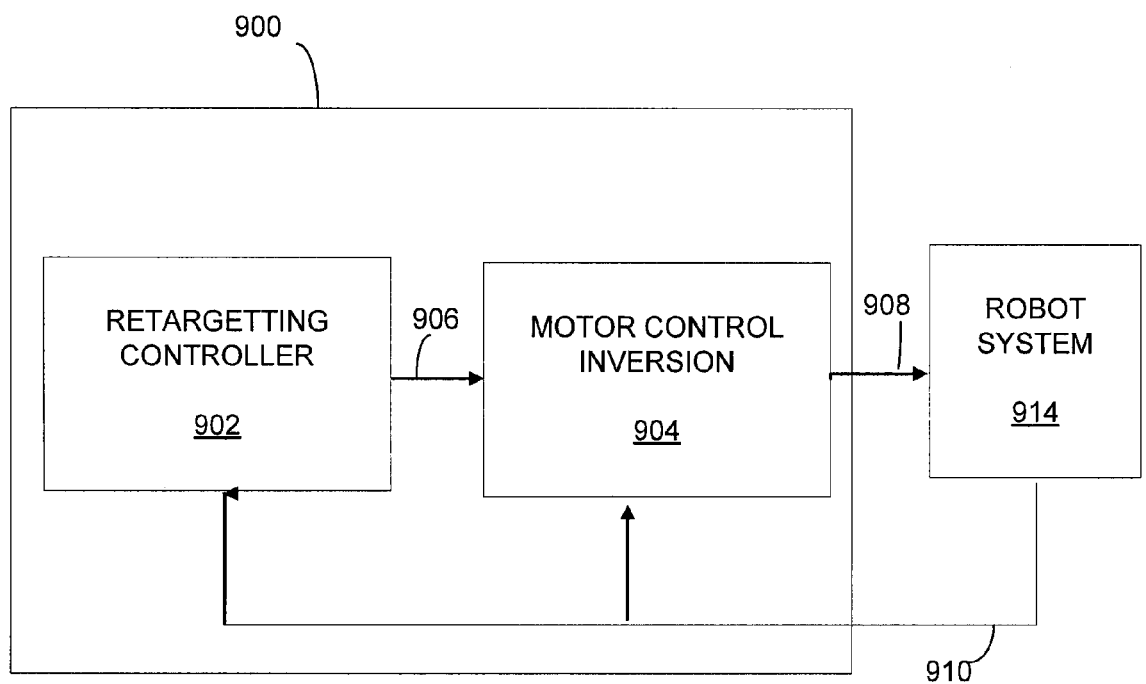
FIG. 9 is a block diagram illustrating a tracking control system with motor control inversion.

FIG. 9 is a block diagram illustrating a tracking control system 900 with motor control inversion. A retargetting controller 902 generates a control command 906 for application to a motor control inversion system 904, which generates a robot command 908 for application to a robot system 914. In one embodiment, the control command 906 is a torque command and the robot command 908 is a position command.

In the systems described above, the retargeting system computes torque and provides a torque control command to the robot system, for example, to drive a motor shaft in the robot. In one embodiment, an actuator in the robot system is a permanent magnet DC motor. Such motors are driven by a controllable voltage or current source. Some robot manufacturers allow the user to indirectly command a desired torque by applying a voltage that is proportional to the armature current. Because motor torque is proportional to armature current, the retargeting system can directly and accurately controls torque.

In some embodiments, a robot may not be commanded by current (and therefore torque), but the robot may include a control scheme, such as some combination of position, velocity, and derivative action to independently control each joint. Such combinations may include proportional plus integral (PI), proportional plus derivative (PD), or proportional plus integral plus derivative (PID). The tracking control system 900 provides a robot command 908, such as position or velocity, to control the robot, which executes the command using an internal joint controller. In one embodiment, the motor control inversion system 904 generates the robot command 908 to cancel the dynamics of the motor and the independent joint controller supplied by the manufacturer or provided by the robot system to the tracking control system 900. The motor control inversion system 904 may include an outer loop control to command torque to robots that are designed to accept only position commands.

The tracking control system 900 may provide robot commands 908 to linear or non-linear robots with varying payloads in response to non constant feedback gains. In one embodiment, the tracking control system 900 uses a dynamic model of the robot. See, e.g., C. An, C. Atkeson, and J. Hollerbach, *Model-Based Control of a Robot Manipulator*, MIT Press (1988). In one embodiment, the tracking control system 900 uses PD control with gravity compensation. See, e.g., M. Takegaki and S. Arimoto, "A new feedback method for dynamic control of manipulators", *ASME J. of Dynamic Systems, Measurement, and Control*, 102:119-125, (1981). In one embodiment, the tracking control system 900 uses non-model based control strategies using soft computing approaches such as fuzzy logic, neural networks, genetic algorithms, and the like.

Motor and Controller Dynamics

Figure 10:
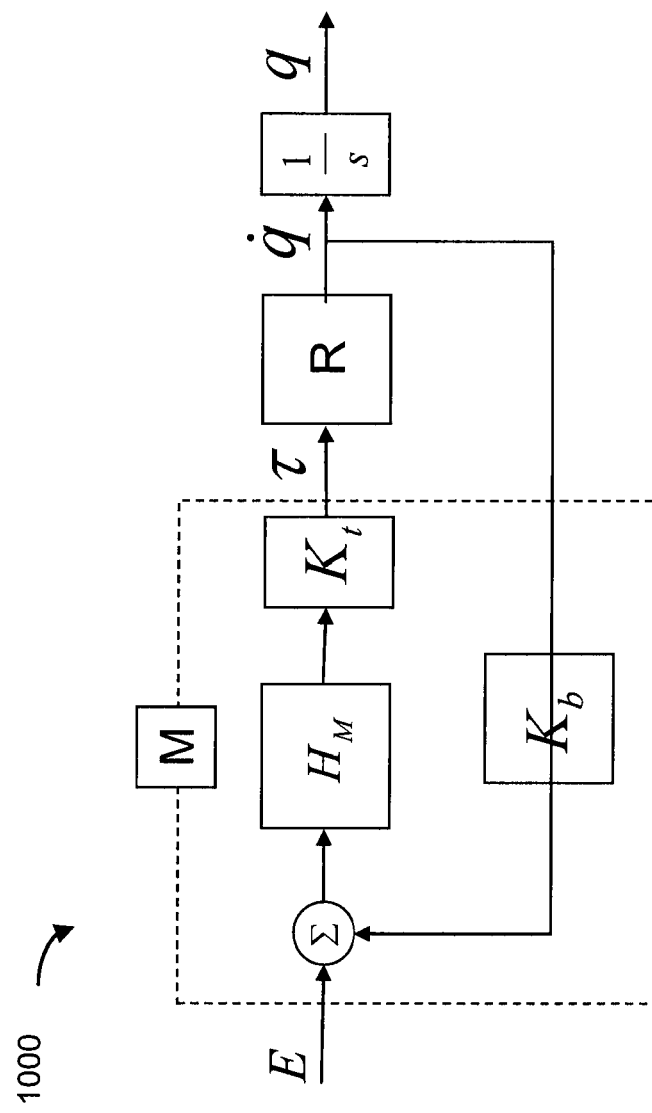
FIG. 10 is a block diagram illustrating a motor control system using an open loop transfer characteristics of a motor and a robot.

FIG. 10 is a block diagram illustrating a motor control system using an open loop transfer characteristics of a motor and a robot.

In order to simplify analysis, a Laplace transform technique is used to derive the motor and controller dynamics, considering a single joint robot arm. The final results for multi-joint robots are also described using the state space representation.

Consider first the motor dynamics. The most commonly used actuator for robots is the permanent magnet DC-motor. In a Permanent Magnet motor, a coil of wire called the armature is arranged in the magnetic field of a permanent magnet in such a way that it rotates when a current is passed through it. Let $i_a$ and $E$, represent the armature current and voltage, respectively, and $L_a$, $R_a$, and $K_b$ represent, respectively, the armature inductances, armature resistances, and back emf constants. The actuator dynamics for the armature controlled DC motor is described by:

$$L_a \frac{di_a}{dt} + R_a i_a = E - K_b \dot{q} \qquad (93)$$

where the motor shaft speed and the angular displacement of the motor shaft are $\dot{q}$ and $q$, respectively. In geared robots, the angular displacement of the load shaft is related to q by the gear ratio. As an illustrative embodiment, the gear ratio is assumed to be unity for simplicity and clarity. The torque developed at the motor shaft is proportional to the armature current, $$\tau = K_t i_a \qquad (94)$$

where $K_t$ is the motor-torque proportional constant. Substituting equation 88 into equation 87 and taking the Laplace transform, the torque developed by the motor may be expressed by:

$$\tau(s) = K_t H_m(s)(E(s) - sK_b Q(s)) \qquad (95)$$

Where $H_m$ is defined by:

$$H_m(s) = \frac{1}{sL_a + R_a} \qquad (96)$$

The torque $\tau$ developed at the motor shaft is equal to the sum of the torques dissipated by the motor ($\tau_m$) and the torque on the robot referred to the motor shaft ($\tau_L$). The plant, comprising the motor and the robot as seen by the shaft is denoted by R. The input output transfer characteristics of the motor are illustrated in FIG. 10, where the motor transfer function is depicted by block "M".

The system 1000 may be controlled with independent joint position controllers. The controllers servo the motor such that the actual angular displacement of the joint (q) tracks a desired angular displacement ($q_d$). In one embodiment, a PID controller is used to servo the motor. Let $\tilde{q}$ represent the error between the desired shaft angle $q_d$ and the actual shaft angle q. The transfer function of a PID controller relating the applied voltage to the motor E and the position error $\tilde{q}$ is given by:

$$H_c(s) = \frac{E(s)}{\tilde{Q}(s)} = K_p + sK_v + \frac{K_I}{s} \qquad (97)$$

where $K_p$, $K_I$, and $K_v$, represent the proportional, integral, and derivative feedback gain constants. It follows from equation 77 that the applied voltage E is, $$E(s) = H_c(s)(Q_d(s) - Q(s)) \qquad (98)$$

Figure 11:
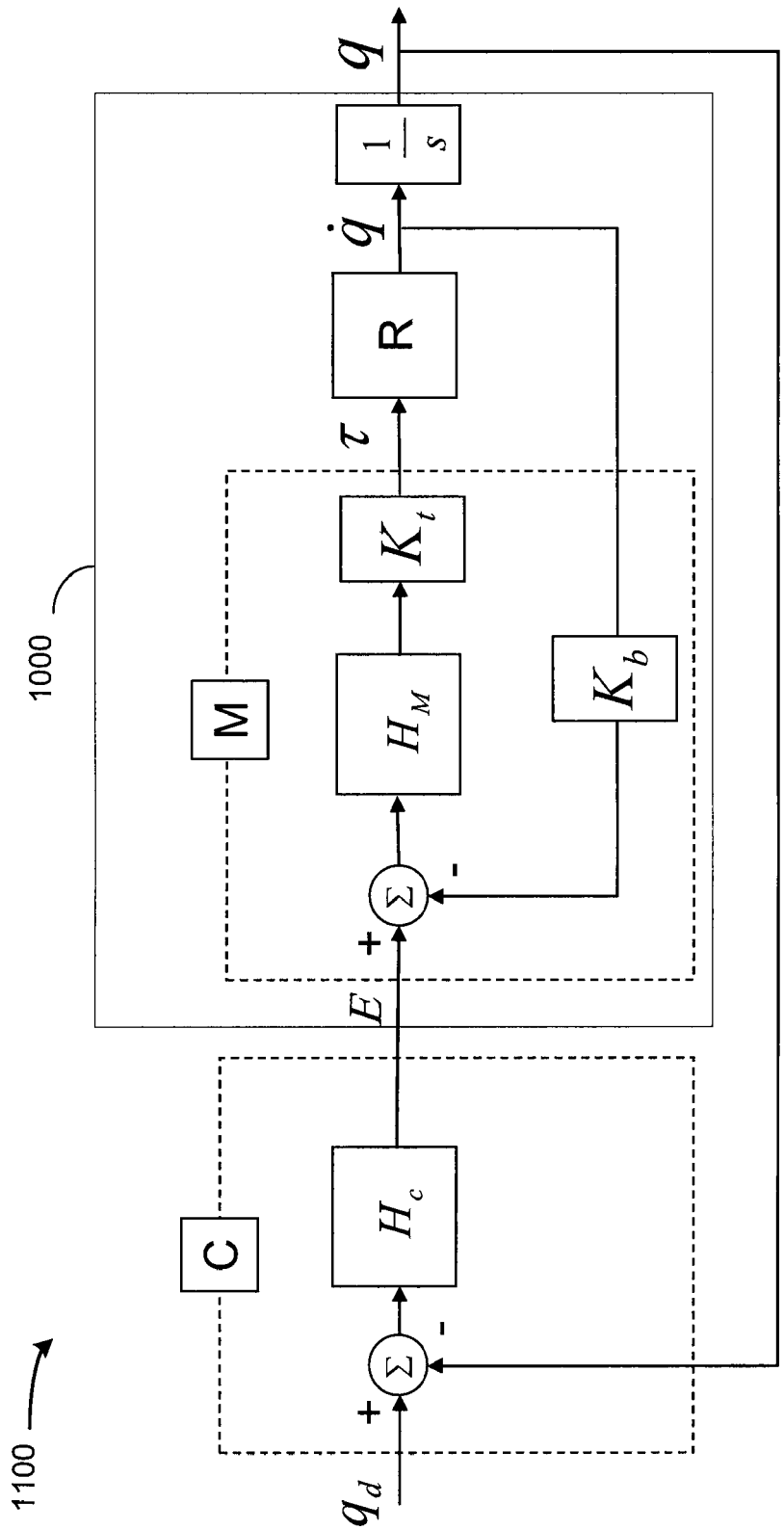
FIG. 11 is a block diagram illustrating a motor control system using a closed loop.

FIG. 11 is a block diagram illustrating a motor control system 1100 using a closed loop with the motor control system 1000. Equation 98 describes a controller block ("C") in the closed loop position control of the system illustrated FIG. 11.

Motor and Controller Inversion

Figure 12:
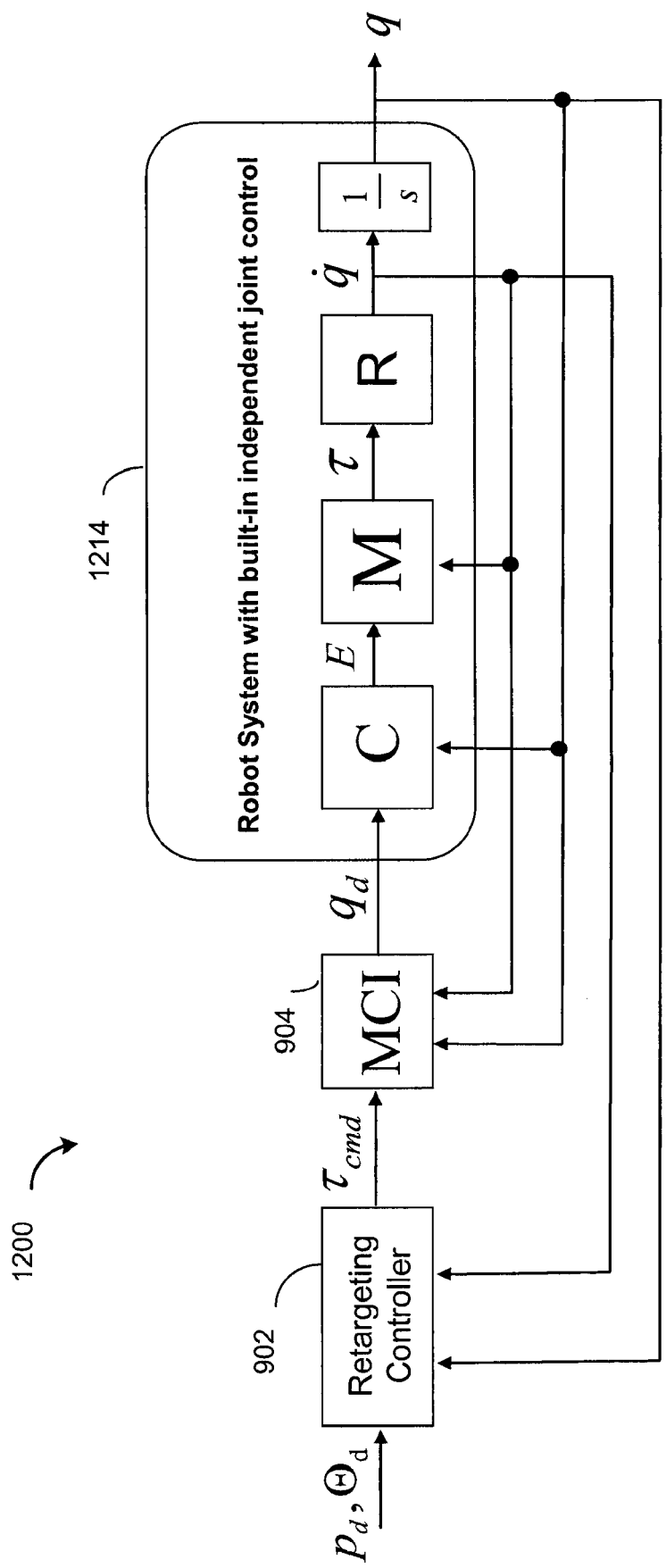
FIG. 12 is a block diagram illustrating a motor control system using the closed loop of FIG. 11.

FIG. 12 is a block diagram illustrating a motor control system using the closed loop of FIG. 11. In this embodiment, the retargetting controller 902 commands torque command $\tau_c$ to control the robot system 1214 using an outer loop control scheme ($C_{OL}$) In one embodiment, the transfer function between the commanded torque $\tau_c$ and the torque $\tau$ in the robot system 1214 is approximately unity. An inversion scheme that achieves this effectively cancels the motor and controller dynamics. The motor and controller inversion (MCI) system 904 provides such cancellation. A basic methodology for an inversion with perfect cancellation is described. In another embodiment, the inversion methodology may be a methodology described in U.S. patent application Ser. No. 11/541,001, filed Sep. 29, 2006, U.S. Publication No: US 2007-0070738 A1, the subject matter of which is incorporated herein in its entirety.

Figure 13:
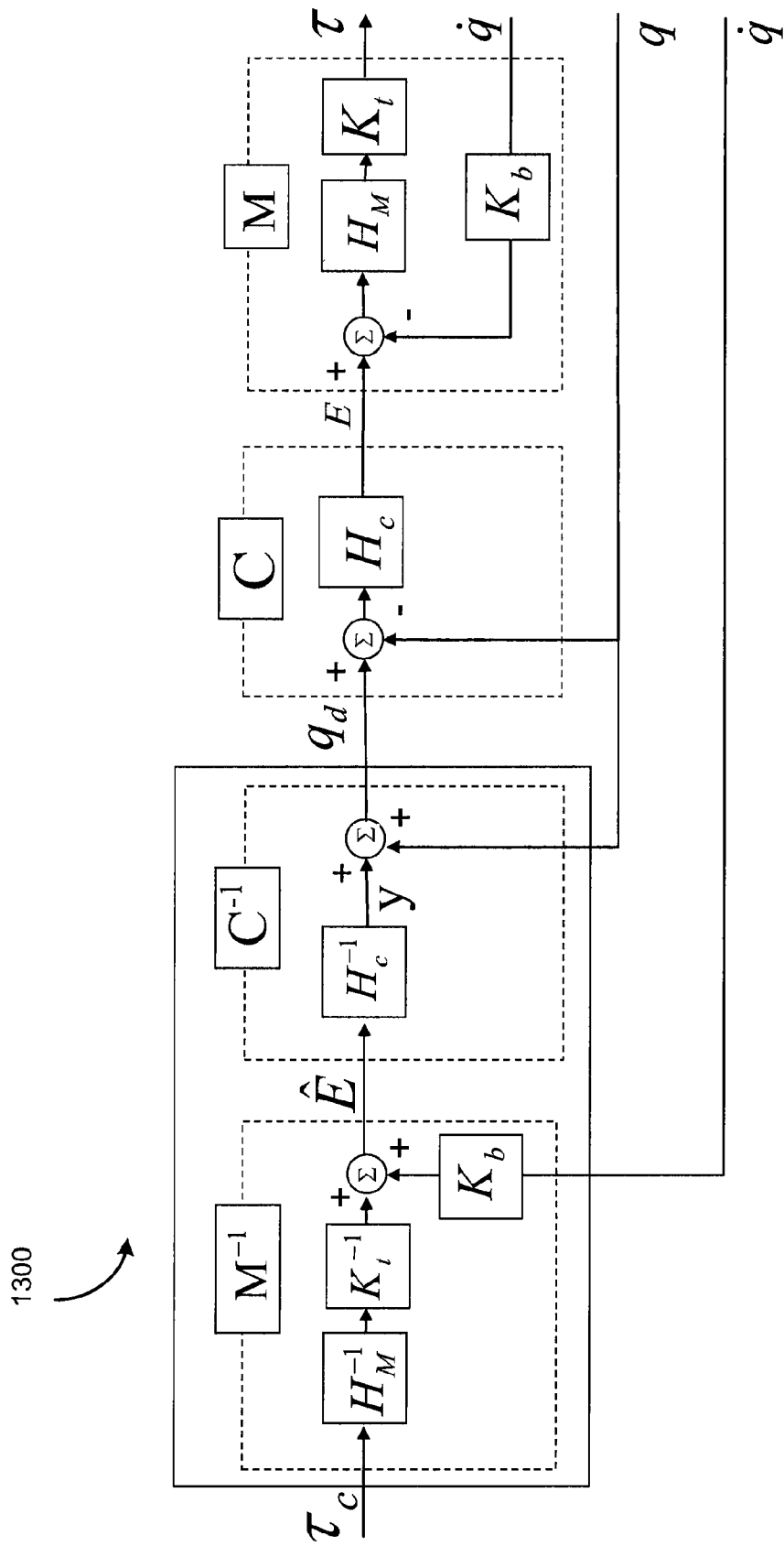
FIG. 13 is a block diagram illustrating a motor control system using an open loop motor and controller inversion.

FIG. 13 is a block diagram illustrating a motor control system 1300 using an open loop motor and controller inversion. In one embodiment, the motor control system 1300 provides perfect inversion. The MCI includes an open-loop invertor, comprising a motor inversion block "$M^{-1}$" and a controller inversion block "$C^{-1}$".

To cancel the effect of the controller, the controller inversion block "$C^{-1}$" with input $\hat{E}$ and output $q_d$ produce a unity gain transfer function between E and output $\hat{E}$. To invert the motor, the MCI block 904 has an input $\tau_c$, and an output E that when cascaded with blocks $C^{-1}$ and C produces a unity gain transfer function between $\tau$ and $\tau_c$. The system including cascading the four blocks. $M^{-1}$, $C^{-1}$, C, and M, as shown in FIG. 13 has transfer characteristics:

$$\frac{\tau}{\tau_c} = \frac{E}{\hat{E}} = 1 \tag{99}$$

In one embodiment, the controller inversion block $C^{-1}$ has a transfer function:

$$Q_d(s) = H_c^{-1}(s)\hat{E}(s) + Q(s) \tag{100}$$

where $H_c^{-1}(s)$ is given by, $$H_c^{-1}(s) = \frac{K_v^{-1} s}{s^2 + K_p K_v^{-1} s + K_I K_v^{-1}} \tag{101}$$

For a robot with n actuated joints, the time domain equations corresponding to a multi-input, multi-output (MIMO) version of the control inversion equation 94 is given by:

$$q_d = y + q \tag{102}$$

where $q_d$, y, and q correspond to n dimensional vectors. The solution to equation 100 may be obtained by solving the following state space equations for the output y:

$$\dot{x} = \begin{bmatrix} \phi & \bar{I} \\ -K_I K_v^{-1} & -K_P K_v^{-1} \end{bmatrix} x + \begin{bmatrix} \phi \\ \bar{I} \end{bmatrix} \hat{E} \tag{103}$$

$$y = [\phi \quad K_v^{-1}] x \tag{104}$$

where $K_P$, $K_v$, and $K_I$ are diagonal n×n position, velocity, and integral gain matrices, respectively, and $\emptyset$ and $\bar{I}$ are n×n zero matrix and identity matrix, respectively.

To invert the motor, we follow a similar approach as the controller inversion $C^{-1}$ may use a similar approach. From Equation 95 and FIG. 13, the inversion equations with $\tau_c$ as input and $\hat{E}$ as output may be derived.

$$\hat{E}(s) = H_m^{-1}(s) K_t^{-1} \tau_c(s) + s K_b Q(s) \tag{105}$$

where $$H_m^{-1}(s) = s L_a + R_a \tag{106}$$

Figure 14:
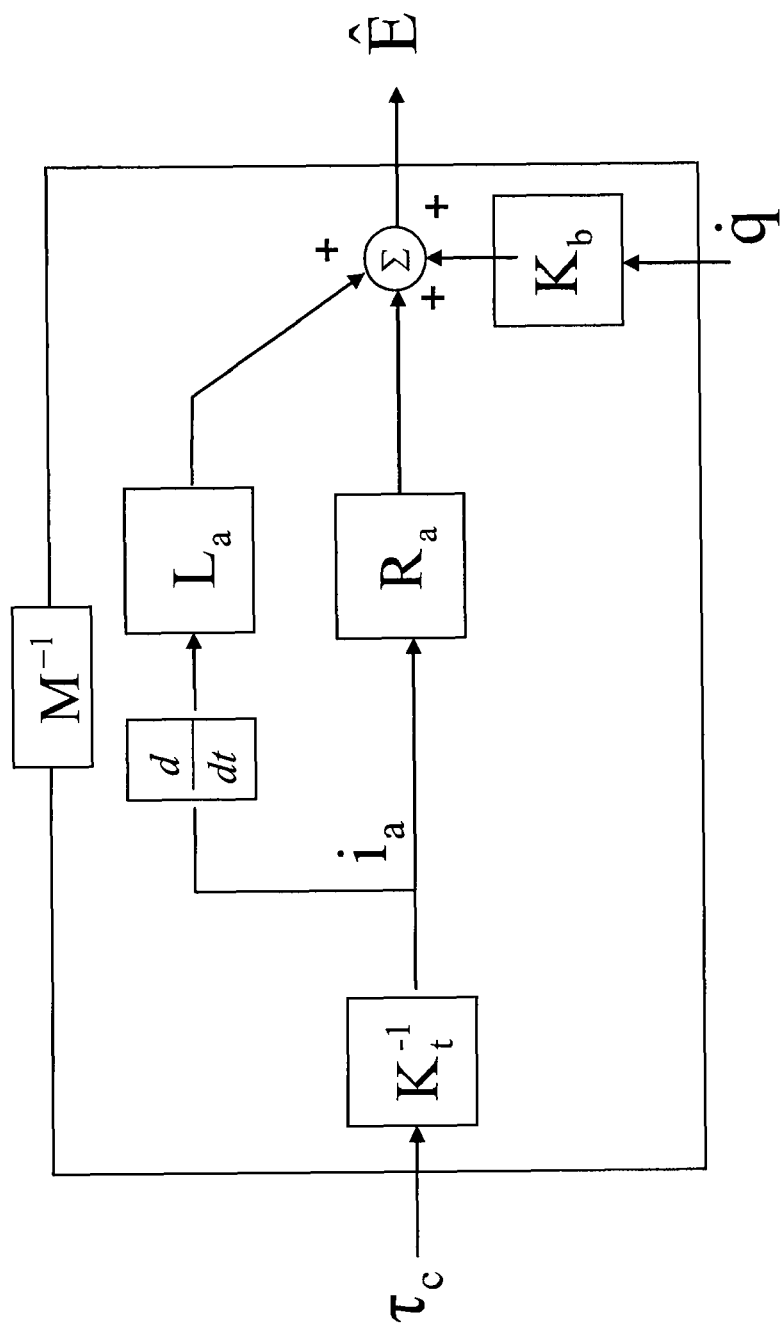
FIG. 14 is a block diagram illustrating a inverse motor block for a multiple-input multiple-output (MIMO) system.

FIG. 14 is a block diagram illustrating a inverse motor block $M^{-1}$ for a multiple-input multiple-output (MIMO) system.

The MIMO time domain solution for the motor inversion block $M^{-1}$ is obtained from the following equations, $$\hat{E} = L_a \frac{di_a}{dt} + i_a R_a + K_b \dot{q} \tag{107}$$

$$i_a = K_t^{-1} \tau_c \tag{108}$$

where the boldface quantities denoted by upper case letters correspond to n×n diagonal matrices and boldface quantities denoted by lower case letters correspond to n×1 vectors. Equations 107 and 108 may be realized using the block diagram in FIG. 14.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for controlling movement of members of an articulated system, the method comprising:
    determining a plurality of articulated joint space trajectories based on r sensed motion information of the members of the articulated system;
    determining a plurality of reference joint space trajectories based on a tracked motion of a source system, wherein the reference joint space trajectories are determined independently from the articulated joint space trajectories;
    constructing a weighted matrix based on constraints on movement of the members of the articulated system, the reference joint space trajectories, and the articulated joint space trajectories; and
    determining a joint velocity vector based on the weighted matrix, the reference joint space trajectories, and the articulated joint space trajectories; generating torque commands that control movement of the members of the articulated system while enforcing constraints on movement of the members by a control law incorporating: a first constant diagonal feedback gain matrix based on the joint velocity vector, a second constant diagonal feedback gain matrix based on the reference joint space trajectories and the articulated joint space trajectories, and a third constant diagonal feedback gain matrix.

2. The method of claim 1 wherein determining the reference joint space trajectories includes inverse kinematics.

3. The method of claim 2 wherein determining the reference joint space trajectories further comprises regularizing an inverse Jacobian matrix used to describe the differential kinematics of variables in the articulated system.

4. The method of claim 1 wherein the determining the reference joint space trajectories includes:
    generating a position error and an orientation error based on the tracked motion of the source system and a previous reference joint space position;
    generating a velocity error and an angular velocity error based on the tracked motion of the source system and a previous reference joint space velocity; and
    determining the reference joint space trajectories based on the errors.

5. The method of claim 1 wherein the control law further incorporates an estimate of a gravitational torque.

6. The method of claim 1 wherein each of the generated torque commands controls a joint of the articulated system independently of the other torque commands, and wherein the control law comprises an identity matrix and a plurality of constant diagonal feedback gain matrices.

7. The method of claim 1 wherein the constraints include singularities arising from limitations of performing tasks due to insufficient degrees of freedom for executing the tasks.

8. The method of claim 1 wherein the constraints include singularities arising from the generation of the torque commands.

9. The method of claim 1 wherein the articulated system is a human model.

10. The method of claim 1 wherein the articulated system is a robot.

11. The method of claim 1 wherein the articulated system is a exoskeleton apparatus.

12. The method of claim 1 wherein enforcing constraints includes:
modulating time between sample times of generating torque commands if the movement of a member of the articulated system has a velocity above a threshold.

13. The method of claim 1 wherein constructing the weighted matrix includes:
prioritizing tasks.

14. The method of claim 1 wherein the source motion comprises human features obtained from images or data.

15. The method of claim 1 wherein determining the reference joint space trajectories comprises determining a position error and an orientation error between a previously determined reference joint space trajectory and the tracked motion of the source system.

16. A system for controlling movement of members of an articulated system, the system comprising:
an input for determining a plurality of articulated joint space trajectories based on a sensed motion information of the members of the articulated system;
a tracking system for determining a plurality of reference joint space trajectories based on a tracked motion of a source system, wherein the reference joint space trajectories are determined independently from the articulated joint space trajectories;
a constraint system for constructing a weighted matrix based on constraints on movement of the members of the articulated system, the reference joint space trajectories, and the articulated joint space trajectories; and
determining a joint velocity vector based on the weighted matrix, the reference joint space trajectories, and the articulated joint space trajectories; a control system for generating torque commands that control movement of the members of the articulated system while enforcing constraints on movement of the members by applying a control law incorporating: an estimate of a joint space inertia matrix; an estimate of Coriolis and centripetal torques; an estimate of a gravitational torque; an estimate of a friction torque; and a plurality of constant diagonal feedback gain matrices, at least one of the constant diagonal feedback gain matrices based on the joint velocity vector.

17. A method for controlling movement of members of an articulated system, the method comprising:
determining a plurality of articulated joint space trajectories based on a sensed motion information of the members of the articulated system;
determining a plurality of reference joint space trajectories based on a tracked motion of a source system, wherein the reference joint space trajectories are determined independently from the articulated joint space trajectories; constructing a weighted matrix based on constraints on movement of the members of the articulated system, the reference joint space trajectories and the articulated joint space trajectories; determining a joint velocity vector based on the weighted matrix, the reference joint space trajectories and the articulated joint space trajectories; and generating torque commands that control movement of the members of the articulated system while enforcing constraints on movement of the members by applying a control law incorporating: an estimate of a joint space inertia matrix; an estimate of Coriolis and centripetal torques; an estimate of a gravitational torque; an estimate of a friction torque; and a reference joint space acceleration based on the joint velocity vector.

18. The method of claim 17 further comprising:
generating a balance control command based on the articulated joint space trajectories, wherein the determination of the reference joint space acceleration is further based on the balance control command.

\* \* \* \* \*